US006233599B1

United States Patent
Nation et al.

(10) Patent No.: US 6,233,599 B1
(45) Date of Patent: May 15, 2001

(54) APPARATUS AND METHOD FOR RETROFITTING MULTI-THREADED OPERATIONS ON A COMPUTER BY PARTITIONING AND OVERLAPPING REGISTERS

(75) Inventors: George Wayne Nation, Eyota; Robert N. Newshutz; John Christopher Willis, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/890,867

(22) Filed: Jul. 10, 1997

(51) Int. Cl.[7] .................................................. G06F 9/00

(52) U.S. Cl. ............................... 709/102; 712/207

(58) Field of Search .......................... 395/674, 476, 395/672; 364/200; 709/5, 3, 102, 108, 100, 101, 103, 104, 105, 106

(56) References Cited

U.S. PATENT DOCUMENTS

| | | | |
|---|---|---|---|
| 4,615,004 | * 9/1986 | Chevillat et al. | |
| 4,819,154 | 4/1989 | Stiffler et al. | 364/200 |
| 4,926,323 | 5/1990 | Baror et al. | 364/200 |
| 5,159,678 | 10/1992 | Wengelski et al. | 395/425 |
| 5,345,588 | 9/1994 | Greenwood et al. | 395/650 |
| 5,353,418 | 10/1994 | Nikhil et al. | 395/375 |
| 5,388,224 | 2/1995 | Maskas | 395/325 |
| 5,430,850 | 7/1995 | Papadopoulos et al. | 395/375 |
| 5,553,305 | 9/1996 | Gregor et al. | 395/826 |
| 5,655,132 | * 8/1997 | Watson . | |
| 5,721,868 | * 2/1998 | Yung et al. . | |
| 5,742,822 | * 4/1998 | Motomura . | |

OTHER PUBLICATIONS

Denelcor, Inc., "Heterogeneous Element Processor Principles of Operation", Denelcor HEP Technical Documenation Series, Apr. 1981, Publication No. 9000001, pp. i–A–10.

Motorola, "Coprocessor Interface Description", MC68030 User's Manual, Section 10, pp. 10–1 through 10–52.

Anant Agarwal et al, "Sparcle: An Evolutionary Processor Design for Large–Scale Multiprocessors", IEEE Micro, Jun. 1993, vol. 13, No. 3, pp. 48–61.

Kattamuri Ekanadham et al, "An Architecture for Generalized Synchronization and Fast Switching", Synchronizaiton and Switching Architecture, pp. 285–314.

Herbert II J. Hum et al, "Building Multithreaded Architectures with Off–the–Shelf Microprocessors", Proceedings of IEEE Eighth International Parallel Processing Symposium, Cancun, Mexico, Apr, 1994, pp. 288–294.

* cited by examiner

Primary Examiner—Majid A. Banankhah
(74) Attorney, Agent, or Firm—Karuna Ojanen

(57) ABSTRACT

An apparatus and method for performing multithreaded operations includes partitioning the general purpose and/or floating point processor registers into register subsets, including overlapping register subsets, allocating the register subsets to the threads, and managing the register subsets during thread switching. Register overwrite buffers preserve thread resources in overlapping registers during the thread switching process. Thread resources are loaded into the corresponding register subsets or, when overlapping register subsets are employed, into either the corresponding register subset or the corresponding register overwrite buffer. A thread status register is utilized by a thread controller to keep track of READY/NOT-READY threads, the active thread, and whether single-thread or multithread operations are permitted. Furthermore, the registers in the register subsets include a thread identifier field to identify the corresponding thread. Register masks may also be used to identify which registers belong to the various register subsets.

23 Claims, 22 Drawing Sheets

|   | 0 | 1 | 2 | 3 | 4 | 5 | 6 | 7 |
|---|---|---|---|---|---|---|---|---|
| A | 1 | 1 | 1 | 1 | 0 | 0 | 0 | 0 |
| B | 0 | 0 | 0 | 0 | 1 | 1 | 0 | 0 |
| C | 0 | 0 | 0 | 0 | 0 | 0 | 1 | 1 |

FIGURE 4B

* R >> Physical Registors Available.
  Compilers Typically Make Physical
  Register Assignments at a Later Time
  After Performing Analysis on How Many
  of These "Virtual" Registers Hold
  "Live" Data, Generating "Spill Code", Etc.

APPARATUS AND METHOD FOR RETROFITTING MULTI-THREADED OPERATIONS ON A COMPUTER BY PARTITIONING AND OVERLAPPING REGISTERS

CROSS REFERENCE TO RELATED APPLICATION

The present invention is related to U.S. Pat. No. 6,049,867 entitled "METHOD AND SYSTEM FOR HIGH PERFORMANCE MULTI-THREAD OPERATION IN A DATA PROCESSING SYSTEM" filed on Jun. 7, 1995 (08/473,692), which is hereby incorporated by reference.

BACKGROUND OF THE INVENTION

1. Technical Field of the Invention

The present invention relates in general to a method and apparatus for partitioning a processor register set to improve the performance of multi-threaded operations. More particularly, the present invention relates to a method and apparatus for retrofitting multi-threaded operations on a conventional computer architecture. Still more particularly, the present invention relates to a method and apparatus for partitioning the processor register set and managing the register subsets to improve multi-threading performance of a computer.

2. Description of Related Art

Single tasking operating systems have been available for many years. In single tasking operating systems, a computer processor executes computer programs or program subroutines serially. In other words, a computer program or program subroutine must be completely executed before execution of another program or subroutine can begin.

Single tasking operating systems are inefficient because the processor must wait during the execution of some steps. For example, some steps cause the processor to wait for a data resource to become available or for a synchronization condition to be met. To keep the processor busy and increase efficiency, multi-threaded operating systems were invented.

In multi-threaded operating systems, the compiler breaks a task into a plurality of threads. Each of the threads performs a specific task which may be executed independently of the other threads. Although the processor can execute only one thread at a time, if the thread being executed must wait for the occurrence of an external event such as the availability of a data resource or a synchronization event, then the processor switches threads. Although thread switching itself requires a few processor cycles, if the waiting time exceeds this switching time, then processor efficiency is increased.

Accessing internal state, for example on-chip processor registers, generally requires fewer processor clock cycles than accessing external state, for example cache or memory. Increasing the number of registers inside the processor generally decreases the probability of external accesses to cache or memory. In other words, to decrease the amount of external state memory requests, the prior art generally increases the number of processor registers.

For example, the latest generations of instruction set architectures, including RISC (Reduced Instruction Set Computers) and VLIW (Very Long Instruction Word) processors, typically improve execution of a single task by increasing the number of registers. Such processors often have 64 to 256 registers capable of retaining integer and/or floating point values.

Computer system architectures and programming trends are moving toward multi-threaded operations rather than a single, sequential tasks. To multithread an operation, each task is decomposed by the compiler into more than one thread. Because threads tend to run for much shorter intervals before being completed than a single large task, threads tend to have a smaller associated state per thread. In other words, each thread of a multithreaded operation tends to require fewer associated registers than a single large task which generally requires a large number of registers to execute.

Threads typically are allowed to run until a thread switch event occurs. A thread switch event occurs, for example, when a referenced memory location is not found in the cache or a program-defined synchronization condition is not met. For example, when an L2 cache miss occurs, then the main memory must be accessed which is, of course, very time consuming. Instead of waiting, the processor switches threads.

When a thread is suspended due to a thread switch event, its inactive or NOT READY state may be retained within the processor registers. In the prior art, however, if a given thread does not resume execution within a few thread commutations, the finite register storage available within the processor leads to swapping of thread state between the processor and memory. In other words, the prior art swaps the entire thread context between the inactivated thread and the next thread to be processed.

Thread switching requires several processor cycles and directly competes for processor, bus and memory resources. Because the prior art switches the entire thread state upon a thread switch event, good multithreading performance dictates a reduced internal state or, in other words, a smaller amount of registers within the processor.

Thus, there is a conflict between established processor instruction set architectures optimized for a single task which require a large number of internal processor registers and the demands of newer, multithreaded architectures and programming systems which require relatively few internal processor registers for high-performance, multithreading operations.

Furthermore, the computer industry has a tremendous investment in software and hardware embodying existing instruction set architectures. As a result, it is very difficult to successfully introduce hardware and software which embodies a new and incompatible instruction set architecture.

For example, adding hardware to duplicate the register set is a known technique for increasing multithreaded performance. In other words, the prior art duplicates the entire register set including special purpose registers and general purpose registers so that each thread has its own dedicated register set to facilitate thread switching. Register set duplication, however, greatly increases the circuit complexity and makes the circuit layout more difficult to implement.

SUMMARY OF THE INVENTION

The present invention retrofits multithreaded operations on a computer utilizing an existing instruction set architecture. Introducing a specially designed multithreaded computer requiring an incompatible instruction set architecture may encounter marketing, difficulties. To retrofit multithreaded operations, the invention partitions an existing processor register set into register subsets, including an overlapping register. Because the existing instruction set may be utilized, the marketability of the present invention is enhanced.

After partitioning an existing register set into register subsets, the invention allocates the register subsets to a plurality of threads such that each thread has an associated register subset which stores that thread's resources. Partitioning the processor registers into register subsets permits the processor to have thread resources for each of the various threads readily at hand in the processor registers. To increase the capacity of the partitioned registers, the invention permits overlapping register subsets wherein some or all of the registers are allocated to more than one thread. This invention has clear advantages over the prior art because the entire state for each thread does not have to be exchanged and, instead, the state of each thread is maintained in register subsets within the processor registers.

After loading the register subsets, including the overlapping registers, with corresponding thread resources, the invention manages the register subsets during thread switching.

It is another object of the present invention to provide an improved data processing system and method for implementing multithreaded operations.

It is still another object of the present invention to improve multithreading performance of a processor implementing a conventional instruction set architecture.

It is, therefore, an object of the present invention to partition the processor registers into either overlapping or non-overlapping register subsets and allocate the partitioned register subsets to the plurality of threads.

It is a further object of the present invention to provide a method and apparatus for improving multithreaded performance which avoids swapping an entire thread context by swapping thread resources only when the thread resource or portion thereof is not within the corresponding register subset.

It is still another object of the present invention to provide an apparatus and method for analyzing thread resources in a partitioned register set to identify overlapping registers belonging to a next thread register subset which overlap with active thread registers so that overlapping registers from the active thread registers are stored to permit loading of the overlapping portions of the next thread context into the next thread register subset.

The objects of the invention are achieved by providing an apparatus for retrofitting multithreaded operations on a computer having a processing unit and an activity specifier register, the apparatus including: a processor register set partitioned into register subsets wherein at least two of the register subsets are associated with at least one thread and including an overlapping register subset associated with more than one thread; a load/store unit for loading data into and storing data from the register subsets; a thread controller controlling the load/store unit to load thread resources including activity specifier data for the threads into corresponding register subsets.

The objects of the invention are further achieved by having the thread controller control the load/store unit to load activity specifier data from an active thread register subset into the activity specifier register to permit the processing unit to execute the active thread by utilizing the active thread register subset.

The objects of the invention are further achieved by having the thread controller control the load/store unit to store the contents of the activity specifier register in the active thread register subset and load an activity specifier from a next thread register subset into the activity specifier register upon an occurrence of a thread switch event to permit the processing unit to execute the next thread by utilizing the next thread register subset.

The objects of the invention are still further achieved by having the thread controller control the load/store unit to load thread resources in corresponding register subsets according to a thread priority order.

The objects of the invention are even further achieved by permitting at least one overlapping register and having the thread controller analyze the register subsets to identify an overlapping register associated with the active thread register subset and with the next thread register subset and also having the thread controller swap active thread resources for next thread resources by storing the overlapping register from the active thread register subset in a register overwrite buffer and loading the overlapping register from the next thread register subset with a next thread register resource.

The objects of the invention are even further achieved by providing a plurality of register overwrite buffers, wherein each thread has a corresponding register overwrite buffer.

The objects of the invention are further achieved by providing a method for retrofitting multithreaded operations on a computer having a processing unit, a processor register set, and an activity specifier register, the method including the steps of: partitioning the processor register set into register subsets including an overlapping register subset; allocating the register subsets to a plurality of threads; loading thread resources including activity specifier data into the corresponding register subsets allocated by the allocating step; loading activity specifier data from an active thread register subset into the activity specifier register to permit the processing unit to execute the active thread by utilizing the active thread register subset; storing the contents of the activity specifier register in the active thread register subset and loading an activity specifier from a next thread register subset into the activity specifier register upon an occurrence of a thread switch event to permit the processing unit to execute the next thread by utilizing the next thread register subset.

The objects of the invention are further achieved by partitioning the processor register set into register subsets having an equal number of registers per register subset.

The objects of the invention are further achieved by partitioning the processor register set such that at least one of the register subsets has a different number of registers than another register subset.

The objects of the invention are still further achieved by analyzing the thread register subsets to identify an overlapping register associated with the active thread register subset and with the next thread register subset; swapping active thread resources for next thread resources by storing the overlapping register from the active thread register subset in a register overwrite buffer and loading the overlapping register from the next thread register subset with a next thread resource.

The objects of the invention are still further achieved by providing a plurality of register overwrite buffers, wherein each thread has a corresponding register overwrite buffer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(b) and 4(c) are specific examples of register masks corresponding to the register subsets illustrated in FIGS. 2(b) and 2(c), respectively;

DETAILED DESCRIPTION OF PREFERRED EMBODIMENT

Figure 1A:
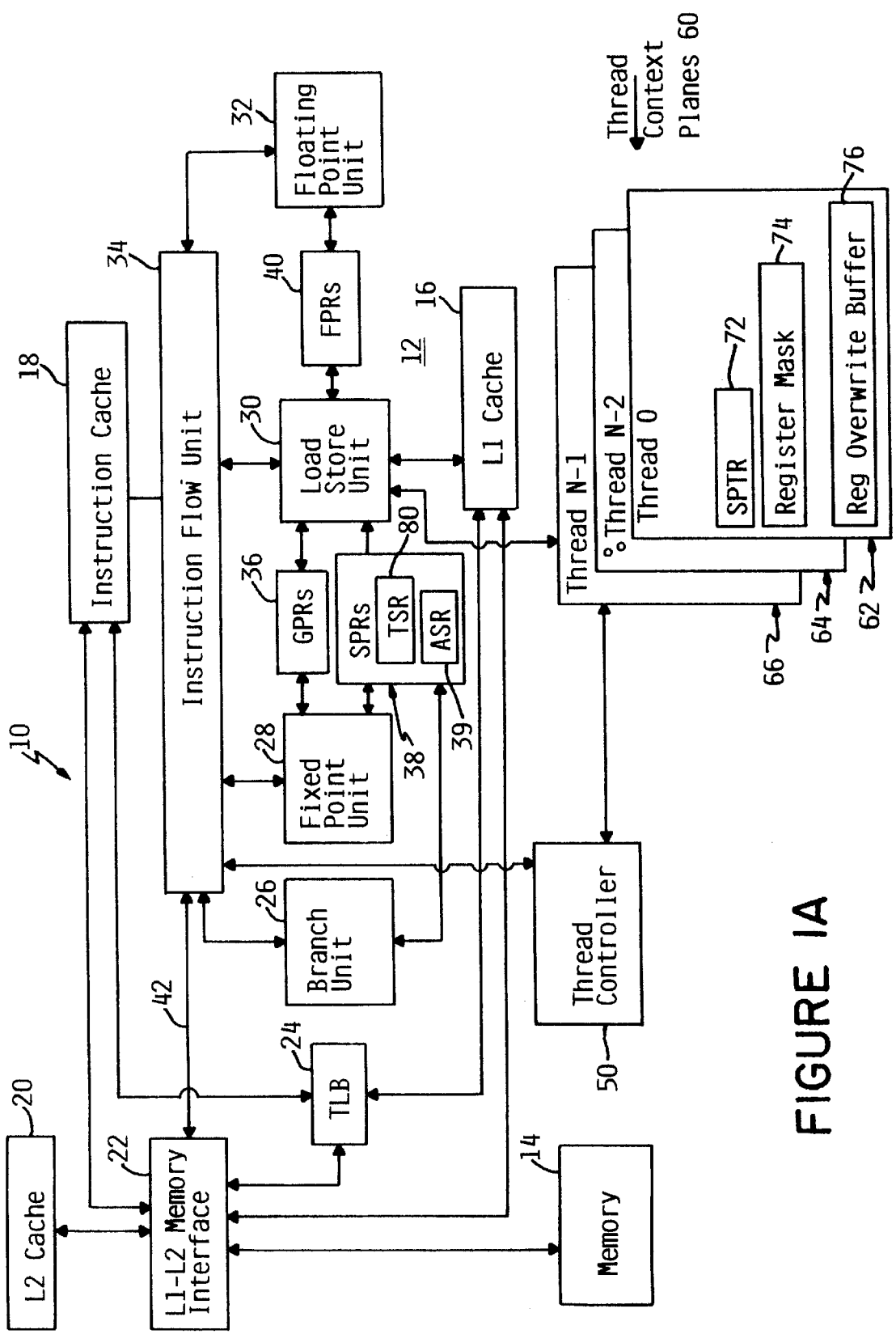
FIG. 1(a) is a high level block diagram of a data processing system which may be utilized to implement the present invention.

With reference now to the figures and in particular with reference to FIG. 1(a), there is depicted a high level block diagram of a data processing system 10 which may be utilized to implement the method and system of the present invention. In a preferred embodiment, processor 12 of data processing system 10 is a single integrated circuit superscalar microprocessor, which may be implemented utilizing any well-known superscalar microprocessor system such as the Power-PC Microprocessor manufactured by International Business Machines Corporation of Armonk, N.Y. It is not necessary that the microprocessor be a superscalar microprocessor; alternative processors known in the art may also be used to implement processor 12 so long as it has a processor register set which may be partitioned into register subsets is suitable for implementing the invention.

In addition to the various execution units depicted within FIG. 1(a), those skilled in the art will appreciate that modern microprocessor systems often include multiple versions of each such execution unit. Load store unit 30 receives source operand information from various registers such as general purpose registers (GPRs) 36 and floating point registers (FPRs) 40. Additionally, multiple special purpose registers (SPRs) 38 are utilized in accordance with the method and system of the present invention to store processor state information in response to thread switching. As will be discussed below, data processing system 10 preferably includes various units, registers, buffers, memories and other sections which are all preferably formed by integrated circuitry. As those skilled in the art will appreciate, data processing system 10 preferably operates according to reduced instruction set computing (RISC) techniques because RISC architectures generally allow larger register sets. Although older architectures do not preclude large register sets, such architectures generally have fewer registers. Therefore, architectures employing larger register sets such as RISC architectures are preferably used for the present invention.

As illustrated in FIG. 1(a), data processing system 10 preferably includes an L1 cache 16, and L2 cache 20 and instruction cache 18 which are connected via L1-L2/memory interface 22 to instruction flow unit 34 and memory 14. The L1 cache 16 and the instruction cache 18 also have a direct connection to instruction flow unit 34. A translation lookaside buffer (TLB) 24 is connected to L1-L2/memory interface 22 and interconnects L1 cache 16 and instruction cache 18.

PROCESSOR REGISTERS

The processor registers include general purpose registers (GPRs) 36, special purpose registers (SPRs) 38 and floating point register (FPRs) 40. In this invention, the processor registers which are partitioned into register subsets, as described below, include the GPRs 36 and the FPRs 40. General purpose registers (GPRs) 36 and special purpose registers (SPRs) 38 are connected to the instruction flow unit 34 via fixed point unit 28 and load store unit 30. Load store unit 30 also provides a pathway between L1 cache 16 and instruction flow unit 34. The floating point registers (FPRs) 40 are connected to the load store unit 30 and are also connected to instruction flow unit via floating point unit 32. A branch unit 26 interconnects instruction flow unit 34 and L1 cache 16. The special purpose registers 38 also include one or more activity specifier registers 37 as known in the art. The term "activity specifier register" is a general term which encompasses, for example, one or more program counter registers, stack pointer registers and condition code registers.

Figure 3A:
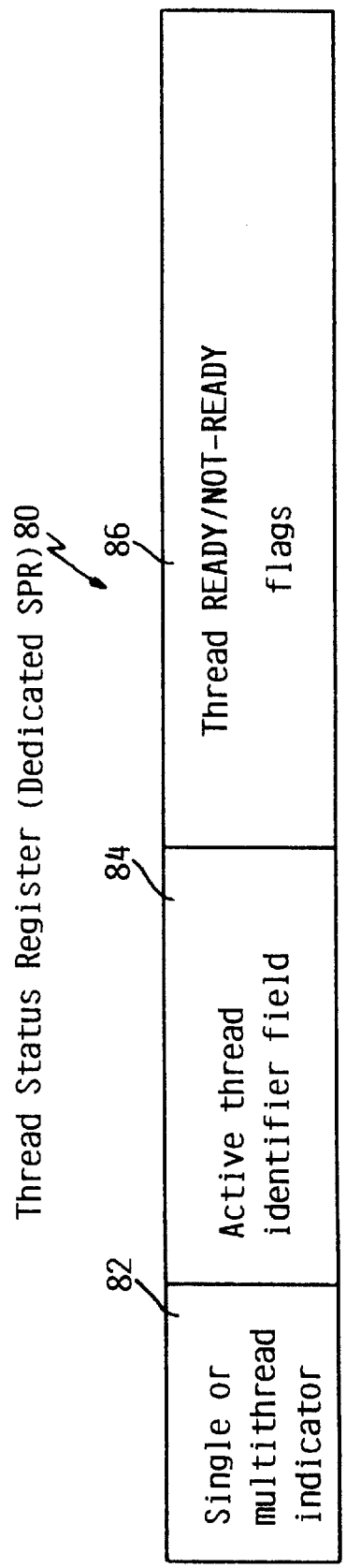
FIG. 3(a) is a diagram illustrating the fields and contents of a thread status register according to the present invention.
Figure 3B:
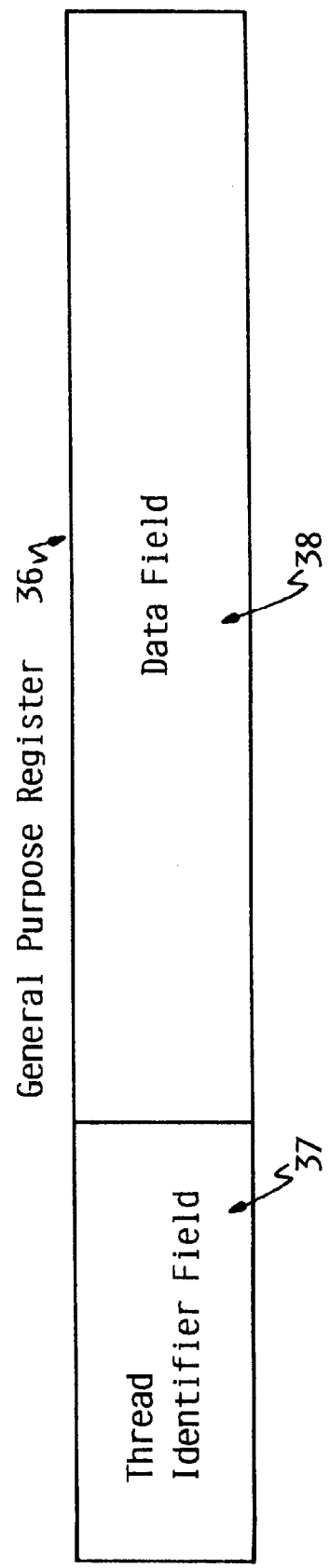
FIG. 3(b) is a diagram illustrating the fields and contents of a general purpose register according to the present invention.

As graphically illustrated in FIG. 3(b), each general purpose register 36 is provided with a thread identifier field 37 and a data field 38. The thread identifier field 37 permits each general purpose register 36 to be uniquely associated with a corresponding thread. As described in detail below, each thread has an associated register subset. Each register subset includes at least one general purpose register 36. To identify which general purpose registers 36 belong to each of the register subsets, the thread identifier field 37 is used. For example, to associate a general purpose register 36 with thread N, the value N may be written into the thread identifier field 37. If the floating point registers 40 are included within the partitioned processor register set, then each FPR 40 also includes a thread identifier field 37.

REGISTER PARTITIONING

To retrofit multithreaded operations on a conventional computer architecture, processor registers GPRs 36 and/or FPRs 40 are partitioned into a plurality of register subsets. This register partitioning is graphically illustrated in FIGS. 2(a)–(c).

Static, Non-overlapping Register Partitioning

Figure 2A:
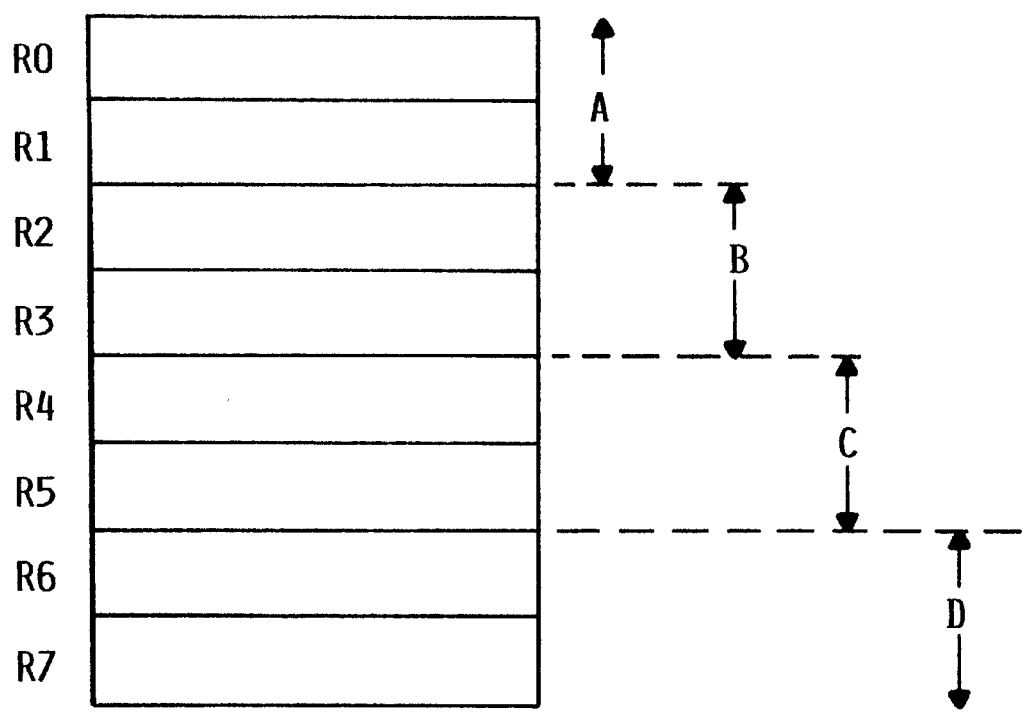
FIG. 2(a) is a diagram graphically illustrating static, non-overlapping register partitioning.

FIG. 2(a) illustrates a static, non-overlapping register partitioning in which a set of eight registers (R0–R7) are partitioned into four equal-size register subsets A, B, C, and D. As will be described in more detail below, thread 0 accesses only those registers in register subset A (R0 and R1) as shown in FIG. 2(a). Similarly, threads 1, 2 and 3 access only register subsets B (R2 and R3), C (R4 and R5) and D (R6 and R7), respectively. FIG. 2(a) is a simple example showing only eight processor registers (R0 to R7) divided into four register subsets (A,B,C and D) to enable the processor 10 to execute four separate threads. It is to be understood that the static, non-overlapping register partitioning may be extended to N threads and M processor registers. In this general case, thread n accesses only GPRs $$n\left(\frac{M}{N}\right) \text{ to } (n+1)\left(\frac{M}{N}\right) - 1.$$

For example: for N=4 and M=32, thread 0 (n=0) accesses only registers R0 through R7 and thread 1 (n=1) accesses only registers R8 through R15.

Dynamic, Non-overlapping Register Partitioning

Figure 2B:
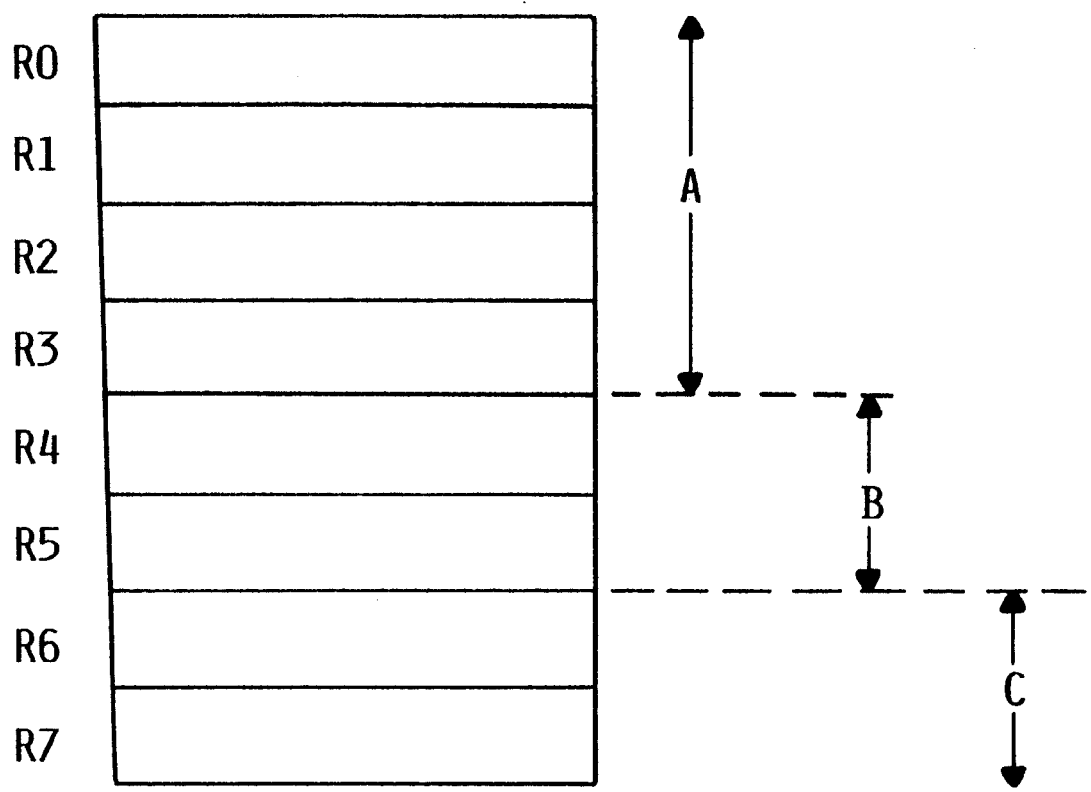
FIG. 2(b) is a diagram graphically illustrating dynamic non-overlapping register partitioning.

FIG. 2(b) graphically illustrates dynamic, non-overlapping register partitioning in which eight general purpose registers (0–7) are dynamically partitioned into three register subsets (A, B and C). For example, thread 0 accesses register subset A including R0 through R3 and thread 1 accesses register subset B including R4 and R5. In dynamic, non-overlapping register partitioning, the number of registers assigned to each thread is not fixed as in the static nonoverlapping register partitioning. In other words, the number of registers making up each register subset may be dynamically varied as further described below in relation to FIG. 6.

Dynamic, Overlapping Register Partitioning

Figure 2C:
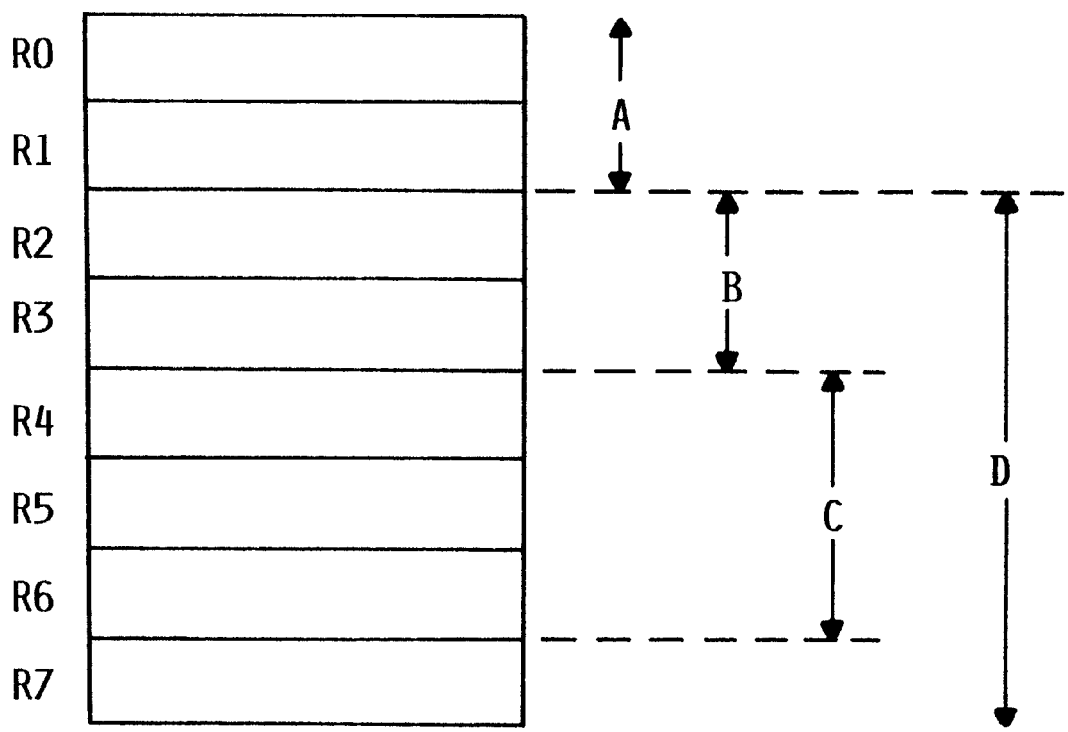
FIG. 2(c) is a diagram graphically illustrating dynamic overlapping register partitioning.

FIG. 2(c) graphically illustrates a dynamic, overlapping register partitioning in which the set of processor registers R0 to R7 is partitioned into four register subsets (A, B, C and D). In this modification, register subsets may overlap. For example, register subset B and register subset C overlap at register R4. Furthermore, a register subset may completely overlap other register subsets as in, for example, register subset D which completely overlaps register subset B including overlapping registers R2, R3 and R4. Register subset D also completely overlaps register subset C including overlapping registers R4, R5 and R6. Also, there may be a non-overlapping register subset such as register subset A in FIG. 2(c) which does not overlap any other register subset. The number of threads, number of register subsets and number of processor registers GPRs 36 and/or FPRs 40 may vary and are not limited to the simplified example shown in FIGS. 2(a)–(c). Although register partitioning has been described by partitioning the general purpose registers 36, it is to be understood that the set of processor registers which may be partitioned includes both general purpose registers 36 and floating point registers 40. Partitioning a set of processor registers which includes both GPRs 36 and FPRs 40 is generally the same as partitioning only the GPRs 36 except that there are more registers to partition.

THREAD CONTEXT PLANES 60

In accordance with the invention, thread context planes 60 are connected to load store unit 30. The thread context planes 60 include thread context planes 62, 64 and 66 for threads 0, N-2 and N-1, respectively. Each thread context plane (62, 64 or 66) in FIG. 1(a) includes special purpose thread registers (SPRs) 72, a register mask 74 and a register overwrite buffer 76.

Figure 4A:
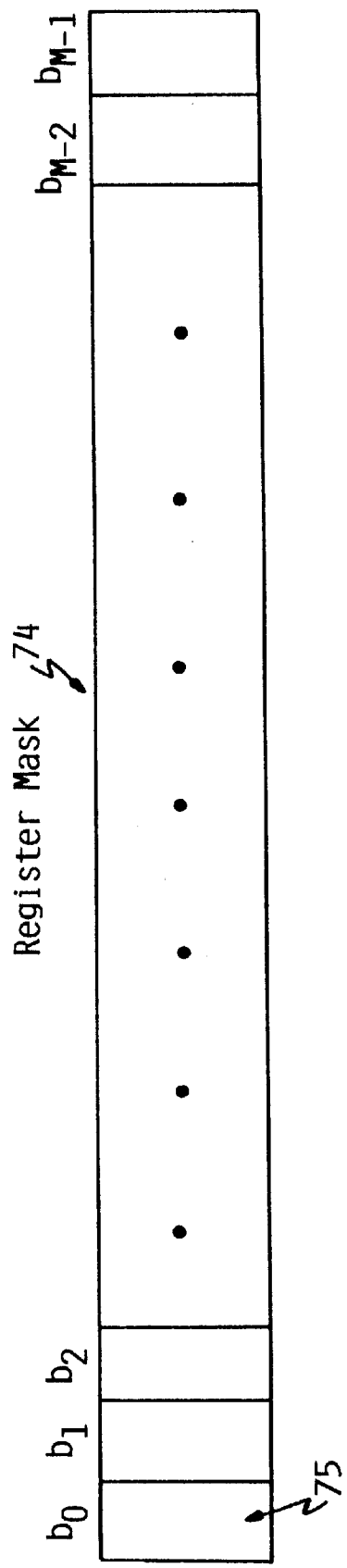
FIG. 4(a) is a diagram illustrating a register mask according to the present invention.

As shown in FIG. 1(a), a register mask 74 is optionally provided for each of the thread context planes 62, 64 and 66. The register masks 74 are described as optional because the thread identifier field 37 in the processor registers GPRs 36 and/or FPRs 40 may be used by the thread controller 50 to identify the entire register subset associated with each of the various threads. Each register mask 74, however, may be used to identify which GPRs 36 and/or FPRs 40 belong to a corresponding thread. More particularly, each bit position in the register mask 74 encodes which GPRs 36 and/or FPRs 40 belong to that thread. The register masks 74 shown in FIG. 1 are more particularly described in FIG. 4(a). As shown in FIG. 4(a), the register masks 74 include bit positions 75 ranging from $b_0$ to $b_{M-1}$ where M is an integer representing the number of processor registers GPRs 36 and/or FPRs 40 to be partitioned. Each of these bit positions 75 encodes whether a particular GPR 36 and/or FPR 40 belongs to a register subset.

Figure 4B:
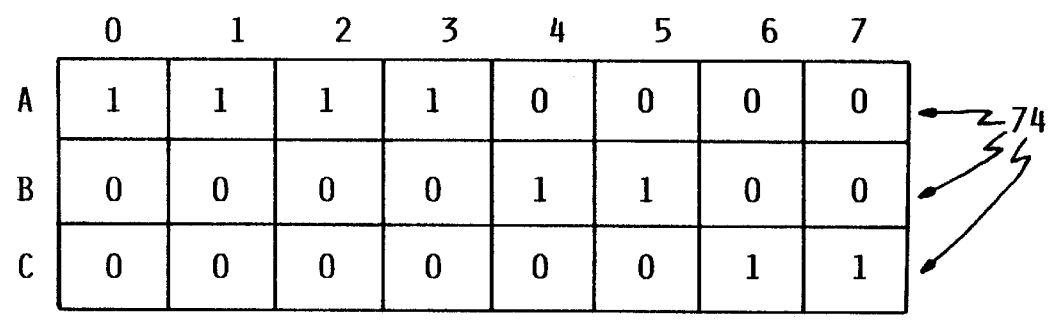
Figure 4C:

FIGS. 4(b) and 4(c) are particular examples of register masks 74. More particularly, FIG. 4(b) describes three register masks 74 respectively corresponding to register subsets A, B and C from FIG. 2(b). The binary value 1 in bit position n of register mask 74 indicates that GPR n belongs to that register subset. Register mask 74 for register subset A in FIG. 4(b) has the binary value 1 for registers R0, R1, R2 and R3 indicating that registers R0, R1, R2 and R3 are associated with register subset A. FIG. 4(c) is another example of register mask 74. FIG. 4(c) is an example which shows the register masks 74 for overlapping register subsets shown in FIG. 2(c). The overlap of general purpose registers is clearly evident from FIG. 4(c).

THREAD STATUS REGISTER 80

A thread may be further implemented in the invention as described herein, by providing a thread status register 80 within a dedicated special purpose register 38 as shown in FIG. 1(a). The construction of the thread status register 80 is further described in relation to FIG. 3(a) which illustrates that the thread status register 80 preferably includes a single-thread or multithread indicator 82, an active thread identifier field 84, and thread READY/NOT-READY flags 86 for each of the threads (0 to N−1). This implementation does not employ the individual thread status registers 85 shown in FIG. 1(b) as will be further explained below. If four threads are permitted within data processing system 10, seven bits are required to encode this information in the thread status register 80, i.e., two bits to encode which of the four threads is active in the active thread identifier field 84, one bit to encode single-thread or multithread operation in the single or multithread indicator 82, and four bits indicating whether each thread is READY or NOT-READY in the thread ready flags 86.

In addition to the thread status register 80 in FIG. 1(a), two existing special purpose registers 38 and/or the special purpose thread registers 72 within each thread context plane 62, 64 and 66 are utilized as save-store registers to store a machine state for that thread. Machine state, in addition to the general purpose register set, is stored in the special purpose thread registers 72. Machine state vital to the thread which is necessary to restart the thread includes, e.g., the address of the instruction which caused the thread switch event, contents of an active condition code register at the time of the thread switch, and any implemented special purpose registers such as a frame or stack pointer.

OVERALL AND INDIVIDUAL THREAD STATUS REGISTERS 90,85

Figure 1B:
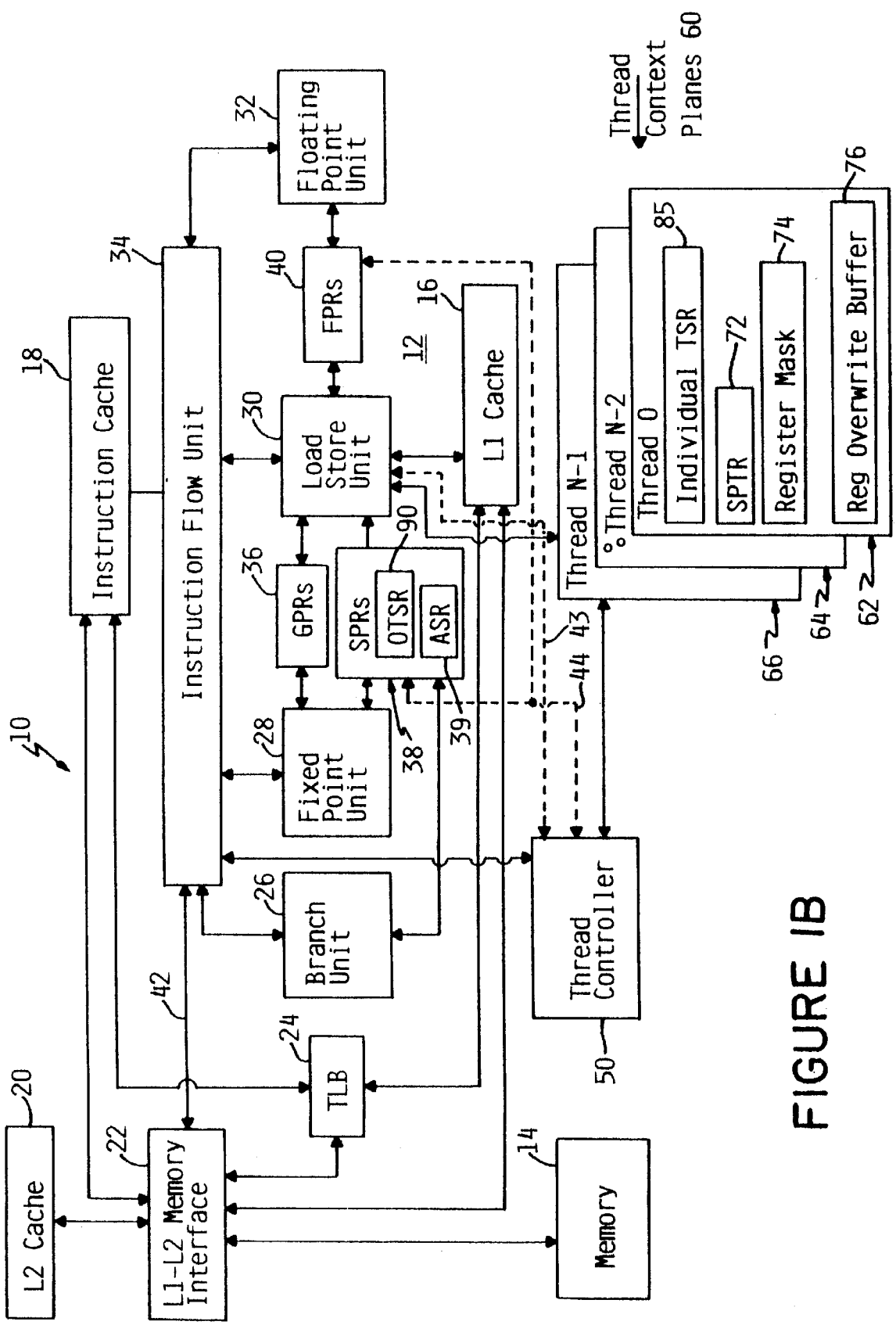
FIG. 1(b) is a high level block diagram of another data processing system which may be utilized to implement the present invention.
Figure 3C:
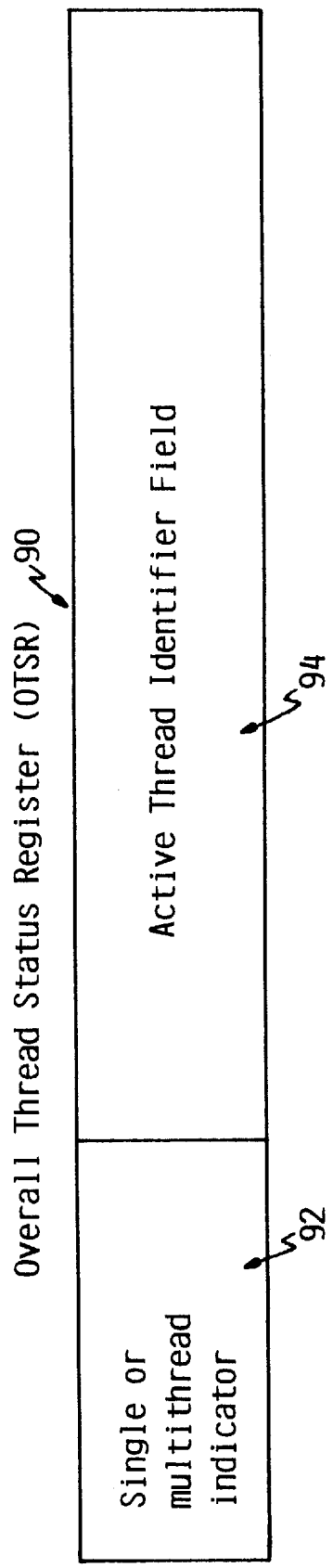
FIG. 3(c) is a diagram illustrating the fields and contents of an overall thread status register according to the present invention.

As an alternative to the thread status register 80 shown in FIG. 1(a), the data processing system 10 may include an overall thread status register (OTSR) 90. Like the thread status register 80 in FIG. 1(a), the overall thread status register 90 is a dedicated special purpose register 38 as shown in FIG. 1(b). The overall thread status register 90, as shown in FIG. 3(c), includes a single-thread or multithread indicator 92 indicating whether single-thread or multithread operations are permitted and an active thread identifier field 94 to identify the active thread.

Figure 3D:
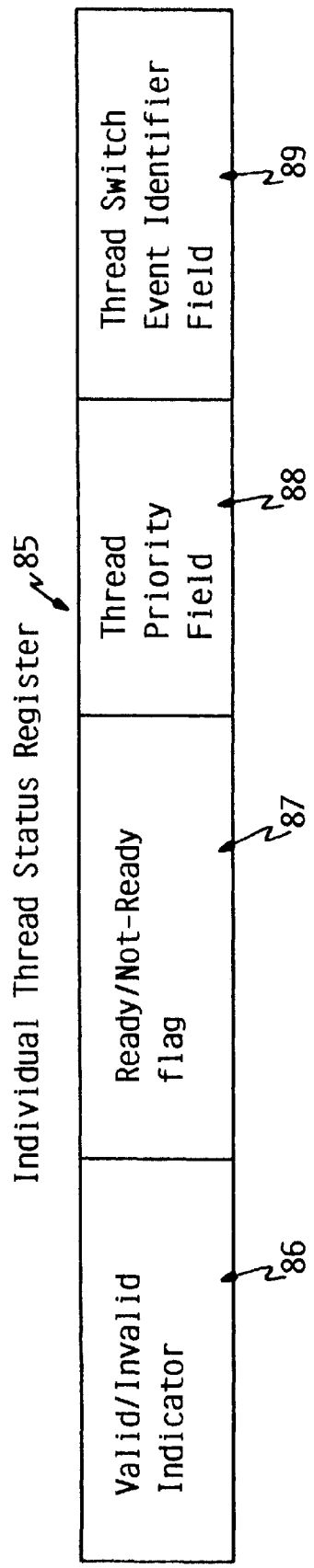
FIG. 3(d) is a diagram illustrating the fields and contents of an individual thread status register according to the present invention.

Each of the thread context planes 62,64,66 includes an individual thread status register 70 as further shown in FIG. 1(b). In addition to the overall thread status register 90, the alternative implementation of FIG. 1(b) employs individual thread status registers (individual TSRs) 85, one of which is provided for each of the individual threads, 0 to N−1 in number and which are located within the corresponding thread context plane 62, 64, or 66. The individual thread status registers 85, as shown in FIG. 3(d), includes a thread valid/invalid indicator 86 indicating whether there is a thread to execute in the associated thread context plane 62, 64 or 66; thread READY/NOT-READY flags 87 indicating whether the associated thread is READY or NOT-READY to execute; a thread priority field 88 indicating the priority of the associated thread relative to other threads; and thread switch event identifier field 89 for identifying the type of switch event that caused the associated thread to switch out.

REGISTER OVERWRITE BUFFER 76

Figure 7:
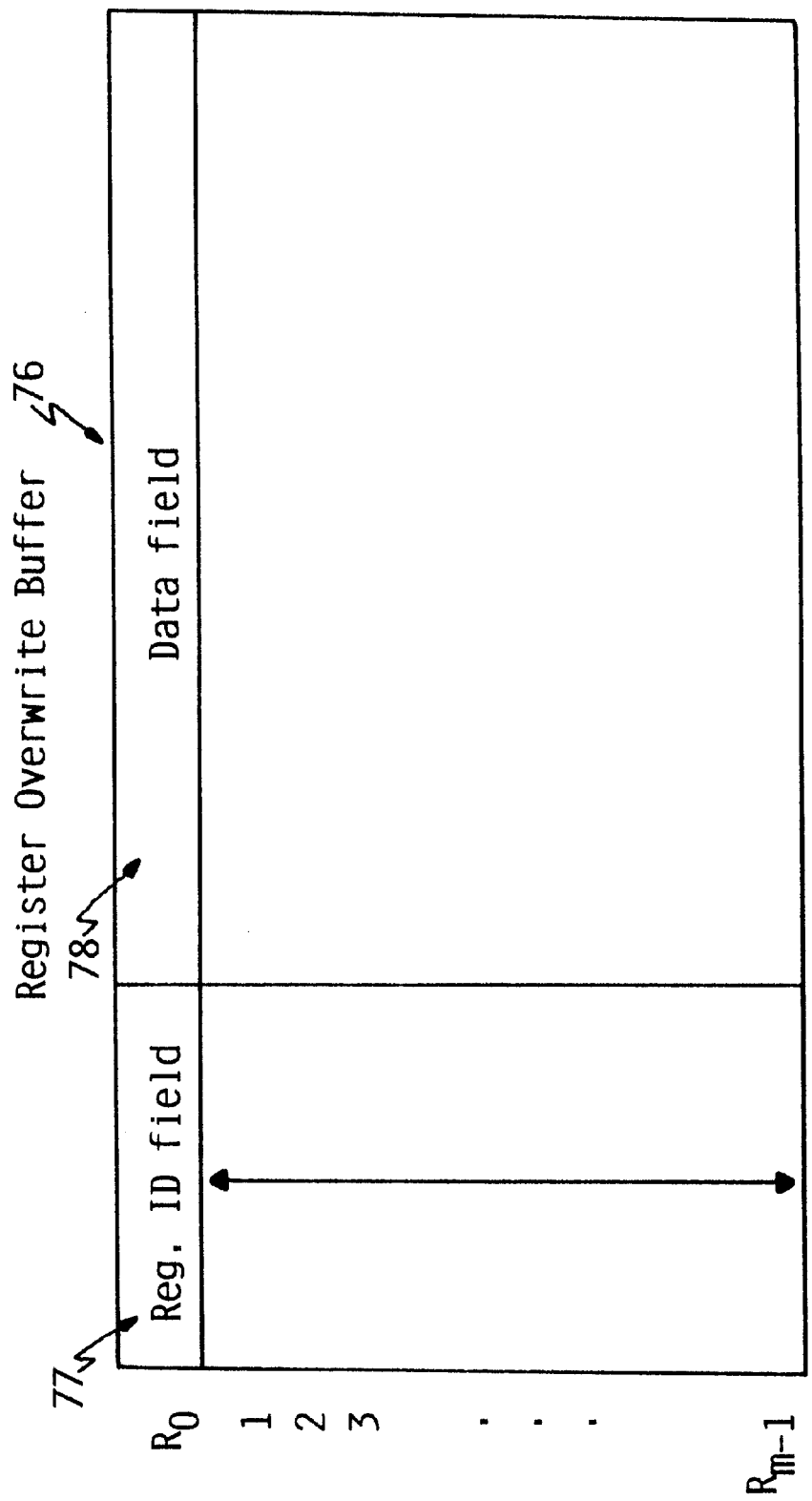
FIG. 7 graphically illustrates the fields and contents of a register overwrite buffer according to the present invention.

As mentioned above, each thread context plane 62,64 and 66 includes a register overwrite buffer 76. As shown in FIG. 7, the register overwrite buffer 76 includes M rows of data corresponding to general purpose registers 36 ranging from $R_0$ to $R_{M-1}$. Each row in the register overwrite buffer 76 includes a register ID field 77 for identifying which of the M GPRs 36 has been stored in this row and a data field 76 for storing the contents of the corresponding GPR 36. As will be described in detail below, the register overwrite buffer is used to temporarily store the contents of overlapping registers.

THREAD CONTROLLER 50

In accordance with the invention, a thread controller 50 is preferably connected between the instruction flow unit 34 and the thread context planes 60, 62 and 66 as shown in FIG. 1(a). In this construction, the thread controller 50 instructs the instruction flow unit 34 to move data between the thread context planes 62, 64 or 66 and the processor registers GPRs 36, SPRs 38 and/or FPRs 40 via load store unit 30.

Alternatively, the thread controller 50 may be connected directly to the load store unit 30 instead of being connected to the instruction flow unit 34 as shown by a dashed connection line 43 in FIG. 1(b). In this alternative construction, the thread controller 50 instructs the load store unit 30 directly to move data between the thread context planes 62, 64 or 66 and the processor registers GPRs 36, SPRs 38 and FPRs 40.

As a further alternative, the thread controller 50 may be connected directly to the processor registers GPRs 36, SPRs 38 and FPRs 40 as shown by the dotted connection line 44 in FIG. 1(b). This further alternative requires providing the processor registers GPRs 36, SPRs 38 and FPRs 40 with an extra port. With such an extra port, the thread controller 50 can directly instruct the processor registers GPRs 36, SPRs 38 and FPRs 40 to move data between the thread context planes 62, 64 or 66 and the processor registers.

GENERAL OPERATION OF DATA PROCESSING SYSTEM 10

With reference to FIG. 1(a), the processing of the invention herein is described. Instructions from instruction cache 18 are preferably output to instruction flow unit 34 which controls the execution of multiple threads by the various subprocessor units within data processing system 10. Instruction flow unit 34 selectively outputs instructions to various execution circuitry within data processing system 10 including branch unit 26, fixed point unit 28, load/store unit 30 and floating point unit 32.

In response to a load instruction, load/store unit 30 inputs information from L1 cache 16 and copies that information to selected buffers for use by the instruction flow unit 34. L1 cache 16 is preferably a small memory which utilizes high speed memory devices and which stores data which is considered likely to be utilized frequently or in the near future by data processing system 10. The L2 cache 20 stores a copy of the data stored within L1 cache 16 and an amount of data copied from main memory 14. L2 cache 20 is preferably a higher speed memory system than main memory store 14 and, by storing selected data within L2 cache 20 in accordance with various well known techniques, the memory latency which occurs as a result of a reference to main memory store 14 can be minimized. When an L2 cache miss occurs, a bus 42 transmits an indication of this thread switching event from L1-L2/memory interface 22 to instruction flow unit 34.

The "Translation Lookaside Buffer" (TLB) 24 contains virtual-to-real address mapping. Although not illustrated within the present invention, various additional high level memory mapping buffers may be provided as known in the art such as a Segment Lookaside Buffer (SLB) which will operate in a manner similar to that described for the TLB 24.

In accordance with an important feature of the present invention, delays resulting from memory latency within data processing system 10 may be reduced by switching between multiple threads in response to, for example, an L2 cache miss.

Operation of L1-L2 Cache/memory Interface 22

In accordance with a method and system of the present invention, the L1-L2 cache/memory interface 22 preferably permits multiple outstanding memory requests. There is one outstanding memory request per thread. Thus, when a thread 0 suspends in response to an L2 cache miss, a thread 1 would be able to access the L2 cache 20 for data present therein. If the thread 1 also encounters an L2 cache miss, another memory request will be issued. Thus, multiple memory request must be maintained within L1-L2 cache/memory interface 22.

The invention also minimizes so-called "thrashing". "Thrashing" occurs when, for example, thread 0 is switched for thread 1, but thread 1 immediately encounters an L2 cache miss resulting in a switch to thread 2 which may also encounter an L2 cache miss resulting in yet another thread switch. Such frequent, unproductive thread switching is called "thrashing" in the art. In order to minimize thrashing, the method and system of the present invention may require that at least a first instruction within each thread must be completed. Thus, if all threads within the system are awaiting an L2 cache miss and the first thread is resumed, it will not find the required data; however, in response to a requirement that at least the first instruction must complete, this thread will simply wait until the L2 cache miss has been satisfied.

GENERAL OPERATION OF THREAD CONTROLLER 50

The thread controller 50 is responsible for partitioning the processor registers GPRs 36 and/or FPRs 40 into a plurality of register subsets, allocating register subsets to corresponding threads, and generally managing the partitioned register subsets as further described below. The thread controller 50 is also responsible for analyzing thread resources to identify overlapping registers belonging to an active thread register subset which overlap a next thread register subset as explained in reference to FIG. 2(c). After analyzing the thread resources, the thread controller 50 then performs data transfers between the register subsets and the thread context planes 60, 62 and 66 to begin the thread switching process. More generally, the thread controller 50 performs thread switching operations to switch between an active thread and the next thread. Thread switching is generally completed, as described below in relation to FIGS. 5 and 9, by loading the activity specifier register 39 with the activity specifier data for a next thread to be executed.

In the alternative implementation shown in FIG. 1(b), an overall thread status register 90 and individual thread status registers 85 are used in place of the thread status register 70 of FIG. 1(a). The thread switch event identifier field 89 in each of the individual thread status registers 85 stores a code indicating what type of thread switch event caused the associated thread to switch out. The thread controller 50 reads the thread switch event identifier field 89 and assigns a priority to the associated thread by writing into the thread priority field 88. For example, the thread switch event identifier field 89 distinguishes between an L1 cache miss with L2 cache hit and an L2 cache miss. The L1 cache miss with L2 cache hit thread switch event has a much shorter latency period than an L2 cache miss because the L2 cache miss results in a time-expensive memory request to memory 14. Knowing the relative latency periods of the various thread switch events enables the thread controller 50 to assign a relative priority to the associated thread. More particularly, the thread controller 50 accesses the thread switch event identifier field 89 to assign relative priorities to the threads. The relative priorities are then stored in the thread priority fields 88 within the individual thread status registers 85.

The operations of the thread controller 50 will be more particularly described in relation to FIGS. 5, 8(a)–(d) and 9.

Managing Non-overlapping Register Subsets

Figure 5:
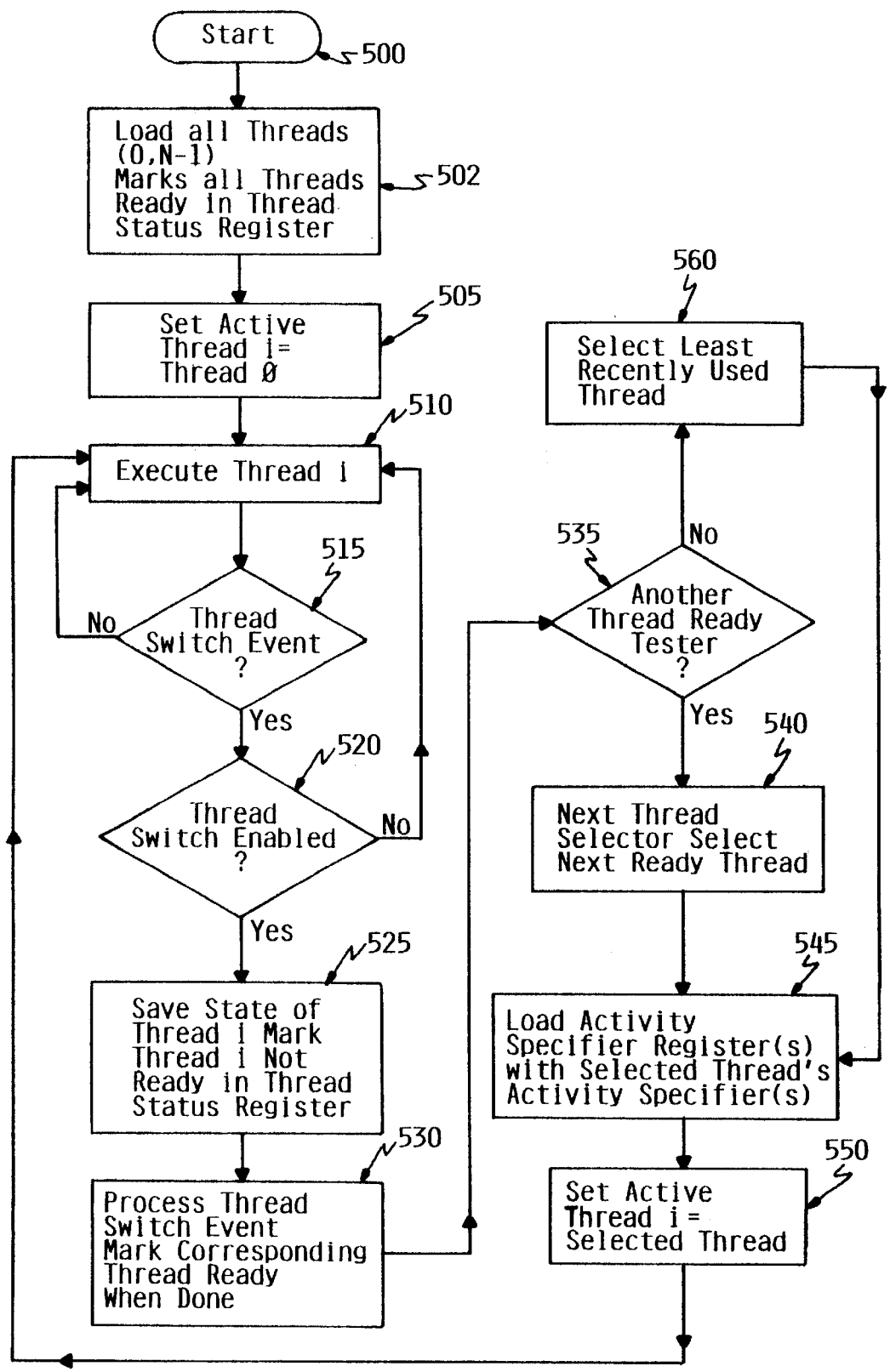
FIG. 5 is a high level logic flow chart of a process which may be implemented within the data processing system of FIGS. 1(a) or 1(b) which illustrates managing registers which have been partitioned into static, non-overlapping register subsets and dynamic, non-overlapping register subsets.

FIG. 5 depicts a high level logic flow chart which illustrates a thread management and thread switching process which may be implemented within the thread controller 50. The process begins at start block 500 and thereafter passes to block 502. Block 502 illustrates the loading of all threads from 0 to N-1 from memory 14 to the corresponding register subsets within GPRs 36 and/or FPRs 40. This thread loading process in block 502 may take several forms as more particularly described in relation to FIGS. 8(a), 8(b), 8(c) and 8(d). For now, it is sufficient to state that the thread loading process may take several forms and that thread loading is different for non-overlapping register subsets and overlapping register subsets.

After loading all threads, block 502 marks all threads READY in thread status register 80. More particularly, corresponding flags of the thread READY/NOT-READY flags 86 in thread status register 80 are set to indicate that the associated threads are READY. Thereafter, the process passes to block 505. If the modifications shown in FIG. 1(b) are used, then, for each of the valid threads, block 502 sets a thread READY/NOT-READY flag in each of the READY/NOT-READY flags 87 within the individual thread status registers 85. Thus, each thread context plane (62, 64 and 66) includes thread ready status indicators which are stored by READY/NOT-READY flags 87 within a corresponding individual thread status register 85. Before marking each thread READY, the thread controller 50 must first check the thread validity/invalidity flag in each of the individual thread status registers 85 to ensure than only valid threads are marked as READY.

Block 505 illustrates setting the active thread (thread i) equal to thread 0. In the FIG. 1(a) embodiment, block 505 sets the active thread by writing thread ID 0 into the active thread identifier field 84 of the thread status register 80. Similarly, in the FIG. 1(b) embodiment, block 505 sets the active thread by writing thread ID 0 into the active thread identifier field 94 of the overall thread status register 90. Alternatively, block 505 may set the active thread i equal to the thread having the highest priority. In this alternative, the data processing system 10 shown in FIG. 1(b) can be utilized. More particularly, the thread controller 50 accesses the thread priority fields 88 in the individual thread status registers 85 to determine which thread has the highest priority. Then, the thread controller 50 can write the ID of the highest priority thread into the active thread identifier field 95 within the overall thread status register 90 to set the active thread.

After block 505, the process passes to block 510. Block 510 illustrates the execution of thread i by data processing system 10. To execute thread i, the activity specifier value from thread i is loaded into the activity specifier register 39. With the activity specifier for thread i loaded, the data processing system 10 can then execute the active thread i by utilizing the associated active thread register subset. Execution of active thread i continues until a thread switch event occurs. Block 515 tests whether such a thread switch event has occurred and, if not, directs the process to continue executing the active thread i in block 510.

Upon the occurrence of a thread switch event, however, block 515 causes the process to continue with block 520. A thread switch event may include an L2 cache miss or translation lookaside buffer 24 miss. Other thread switch events known in the art may also trigger block 515.

Block 520 determines whether thread switching is enabled. To accomplish this determination, block 520 tests the single/multithread indicator 82 in thread status register 80. Alternatively, block 520 tests the single/multithread indicator 92 in overall thread status register 90. If thread switching has not been enabled, then block 520 decides that single-thread operations must be performed and the process must continue to execute the active thread i in block 510. On the other hand, if thread switching is enabled, then block 520 decides that multithread operation may be performed and the process continues with block 525.

To switch threads, the state of thread i must first be saved. Block 525 illustrates saving the state of the active thread i. As discussed above, the state of a thread includes an activity specifier such as the program counter for that thread, condition code register and stack pointer register each of which are unique to a given thread. More particularly, block 525 transfers the activity specifier data for thread i from the activity specifier register 39 to the active register subset. Then, block 525 marks thread i as NOT-READY by setting the corresponding flag in the thread READY/NOT-READY flags 86 within thread status register 80. Alternatively, block 525 marks thread i as NOT-READY by setting the corresponding flag in the thread READY/NOT-READY flags 87 in the corresponding individual thread status register 85.

Thereafter, the process continues with block 530. Block 530 depicts the concurrent processing of the thread switch event and the marking of thread i as READY when the thread switch event has been resolved. In other words, block 530 illustrates continued attempts to complete the process that triggered the thread switching event such as completing the memory request from memory 14. When this thread switch triggering process has been completed, then that thread is now ready and this READY status is then indicated in the thread READY/NOT-READY flags 86 or 87 in either the thread status register 80 or the corresponding individual thread status register 85.

Then, the process continues with block 535. Block 535 decides whether there is another thread ready for execution. More particularly, the thread controller 50 accesses the thread READY/NOT-READY flags 86 or 87 in either the thread status register 80 or the corresponding individual thread status register 85 to determine if there is a thread ready for execution. If there is a thread ready for execution as determined by block 535, then the process passes to block 540. Block 540 selects the next ready thread for execution. The next ready thread may be selected from those threads having a READY flag in the thread READY/NOT-READY flags 86 or 87 in either the thread status register 80 or the corresponding individual thread status register 85.

Selection of the next ready thread in block 540 may also use a thread prioritization scheme which selects the thread having the highest priority and also having a READY status. The thread prioritization scheme is described above in relation to FIG. 1(*b*). The priority of each thread is stored in a thread priority field 88 within each of the individual thread status registers 85. With the thread priority field 88, the thread controller 50 is able to select the highest priority thread for execution as illustrated in block 540. Thread prioritization schemes are generally known to those of ordinary skill in the art and may be used with this invention. The methods and apparati for managing and storing thread priority for partitioned register sets, however, is a feature of this invention.

If block 535 determines that there is not another thread ready for execution, then the process passes to block 560. Block 560 selects the least recently used thread as the next thread to be executed. The thread which was least recently used or executed is generally the thread most likely to have already resolved its thread switch event. Thus, delays due to memory latency may be minimized by selecting the least recently used thread as the next active thread. After blocks 540 or 560, the process continues with block 545.

Block 545 illustrates loading the activity specifier register 39 with the selected thread's activity specifier data. In other words, the state of the selected thread is loaded into the activity specifier register 39. Because the processor registers GPRs 38 and/or FPRs 40 have been partitioned into a plurality of register subsets, thread resources for the selected thread are available within the processor register set. Register partitioning speeds up the thread switching process because each thread has thread resources available within the partitioned processor registers. Switching threads may be quickly accomplished by loading the activity specifier register 39 with the activity specifier data for the selected thread which are stored in a partitioned register subset. Because the thread resources are available within the processor register set, thread switching is fast when compared with conventional multithreaded processors which typically have to exchange the entire processor register set before a thread switch is accomplished.

Before executing the next thread, however, the process continues with block 550. Block 550 illustrates setting the active thread i equal to the selected thread. More particularly, block 550 sets the active thread identifier field 84 in the thread status register 80 to the selected thread ID. Alternatively, block 550 sets the active thread identifier field 94 in the overall thread status register 90 to the selected thread ID.

Thereafter, the process then executes the active thread i in block 510. As described in detail above, FIG. 5 illustrates the process for loading and switching threads when the registers have been partitioned into non-overlapping register subsets. Partitioning the processor registers into register subsets permits the processor 10 to have thread resources for each of the various threads readily at hand in the processor registers GPRs 36 and/or FPRs 40. The entire state for each thread does not have to be exchanged and, instead, the state of each thread is maintained in register subsets within the processor registers.

Although non-overlapping register subsets have advantages as described above, when certain programs are decomposed into multiple threads by a compiler, the threads may require a large amount of registers to execute. Using non-overlapping registers limits the number of available register subsets when the processor registers are partitioned into subsets. To remedy such a register shortage, overlapping registers may be employed as more particularly described below.

DECIDING BETWEEN OVERLAPPING REGISTERS AND NON-OVERLAPPING REGISTERS

Figure 6A:
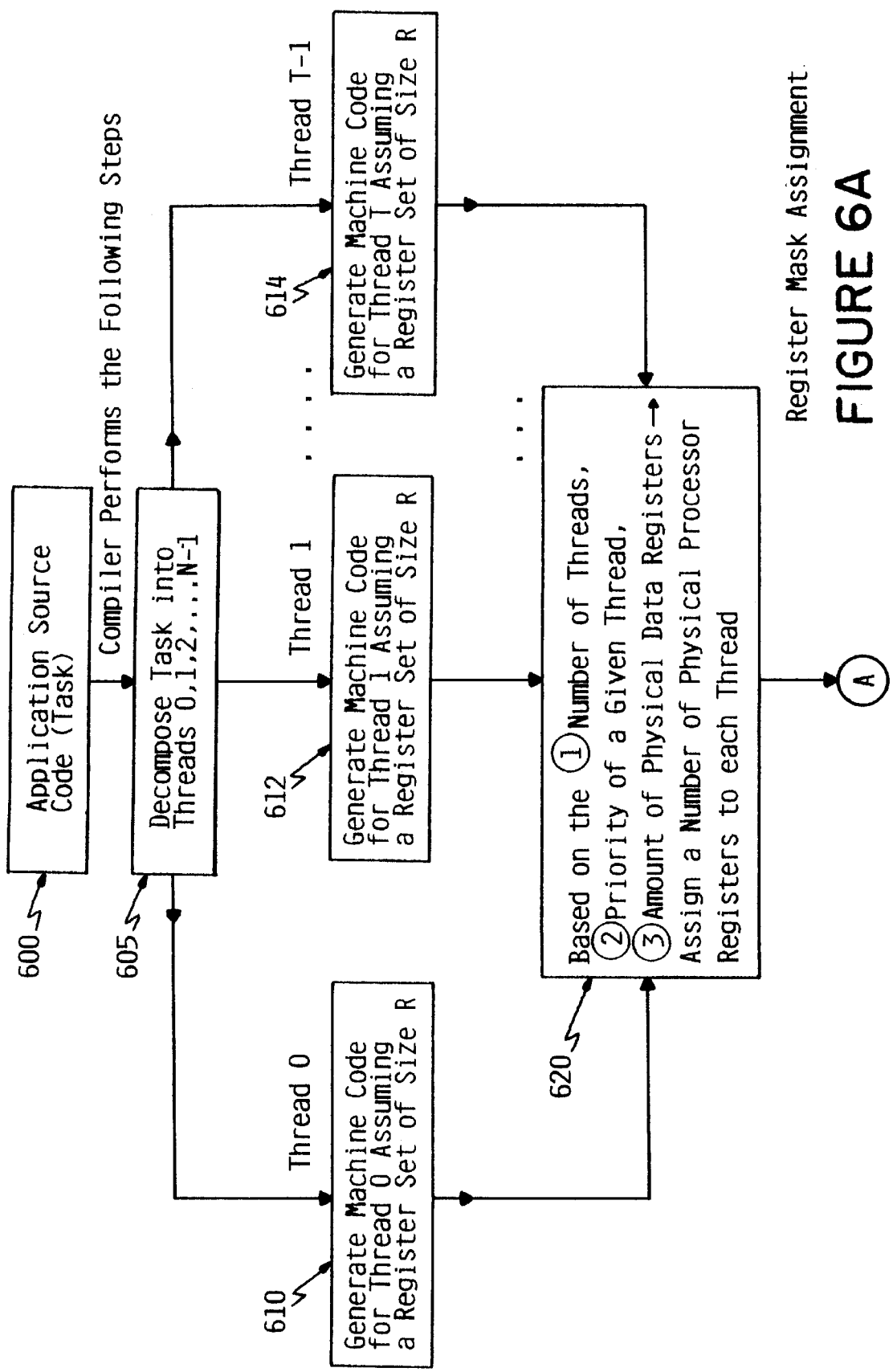
FIG. 6 is a high level logic flow chart of a process which may be implemented within the data processing system of FIGS. 1(a) or 1(b) which illustrates register mask assignment according to the present invention.
Figure 6B:
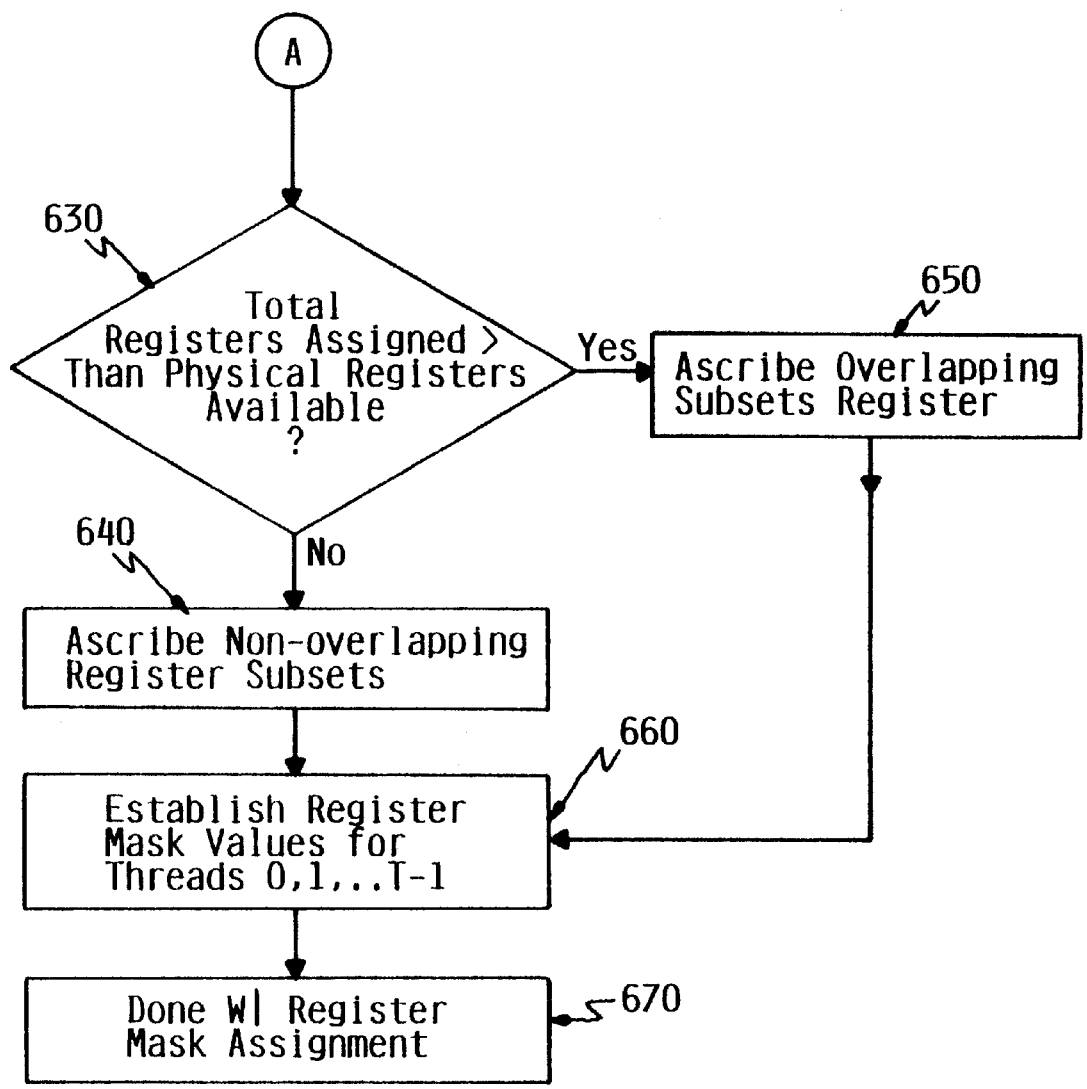

The process of deciding whether to use overlapping or non-overlapping register subsets is more formally described in relation to FIG. 6. FIG. 6 is a high level logic flow chart which illustrates a register mask assignment process which may be implemented with the data processing systems of FIGS. 1(*a*) or 1(*b*). The process begins with start block 600 which illustrates feeding the application source code or task into a compiler capable of performing the processes illustrated in blocks 605, 610, 612, 614 and 620 as more particularly described below.

Block 605 illustrates the compiler decomposing the task into a plurality of threads (0, 1, . . . T-1). The number of threads T may be larger than the number N thread context planes 60. In other words, the compiler may decompose the task into a greater number of threads T than can be processed concurrently within the data processing system 10. To accommodate T>N, the thread controller 50 first loads N threads into the thread context planes 62, 64 and 66 based on thread priority. When a thread is completed, then the corresponding thread context plane 62, 64 or 66 may be loaded with the thread resources from the remaining threads.

For thread 0, as illustrated in block 610, the compiler generates machine code for thread 0 by assuming a virtual register set of size R. The virtual register set size R is greater than the number of physical processor registers GPRs 36 and/or FPRs 40 available. Compilers typically make physical register assignments at a later time after performing analysis on how many of the R virtual processor registers are required to hold the data associated with the various threads.

Similarly, for thread 1, as illustrated in block 612, the compiler generates machine code for thread 1 assuming a virtual register set of size R. For each of the other threads 2 to T-1, as illustrated in block 614, the compiler generates machine code assuming a virtual register set of size R.

After blocks 610, 612 and 614 complete their respective processes, the process continues with block 620. Block 620 illustrates the assignment of physical registers to each of the threads based on, for example, (1) the number of threads, (2) priority of a given thread, and (3) the amount of physical processor registers. As mentioned above, this invention uses a compiler capable of decomposing the task into threads (block 605), generating machine code for the threads (blocks 610–614), and assigning a number of physical registers to each of the threads (block 620). The following steps are not conventionally performed by known compilers and are a feature of this invention.

Block 630 compares the total number of registers assigned in block 620 with the number of physical processor registers GPRs 36 and/or FPRs 40 available in the data processing system 10. If the total number of registers assigned is less than the number of physical processor registers available, then the process passes to block 640 which illustrates ascribing non-overlapping register subsets to the threads. On the other hand, if block 630 determines that the total number of registers assigned is greater than the number of physical registers available, then the process passes to block 650 with ascribes overlapping register subsets.

After block 640 and 650, the process passes to block 660. Block 660 illustrate establishing register mask values for threads (0, 1, . . . N-1). The register masks utilized in block 660 are the register masks 74 illustrated in FIG. 4(*a*). As mentioned above, block 620 determines how many registers are required for each of the threads and blocks 630–650 determine whether non-overlapping or overlapping register subsets will be used. Based on this information, block 660 establishes the register masks 74 for the threads (0, 1, . . . N-1). After establish the register masks 74, the register mask assignment is completed as illustrated by block 670.

Overlapping register subsets cause a problem when switching threads. As described above, overlapping registers are associated with more than one thread. For example, R4 in FIG. 2(*c*) is associated with threads B, C and D. When switching from active thread B to next thread C, for example, R4 may not be simply overwritten by the thread resource from next thread C because thread B's resource in R4 will be destroyed. To resolve this problem, the present invention utilizes a register overwrite buffer 76.

OPERATION OF REGISTER OVERWRITE BUFFER 76

At a minimum, a register overwrite buffer 76 is required for each overlapping register subset. An overlapping register subset contains a register which is associated with more than one thread. For example, thread A in FIG. 2(*c*) would not require a register overwrite buffer 76 because thread A does not have a register subset which overlaps with any other register subset. Threads B, C, and D, however, each require a corresponding register overwrite buffer 76 to store overlapped register values when these threads are switched.

Figure 8A:
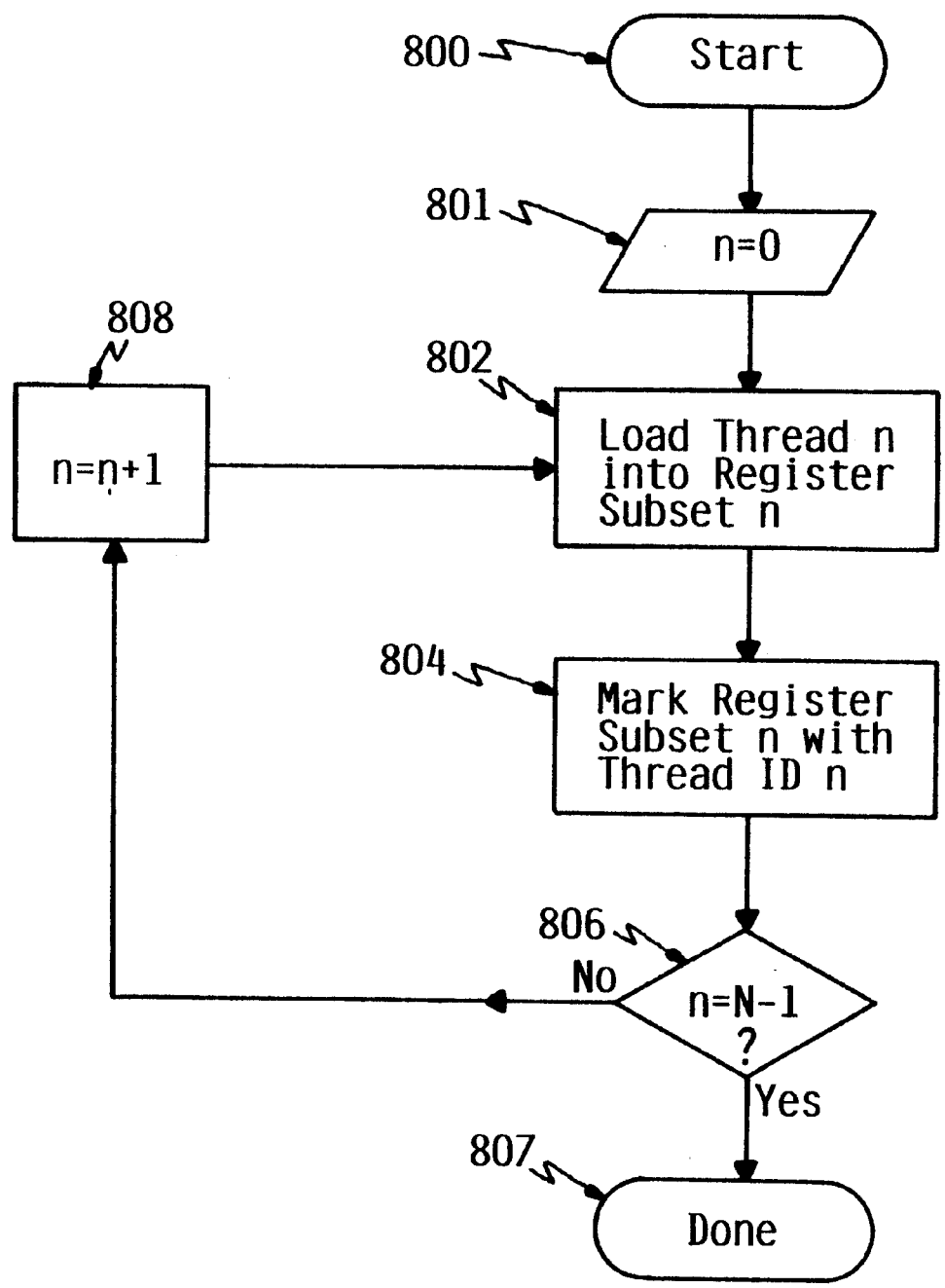
FIG. 8(a) is a high level logic flow chart of thread loading process or system for loading static non-overlapping register subsets and dynamic non-overlapping register subsets which may be implemented within the data processing system of FIGS. 1(a) or 1(b)
Figure 8B:
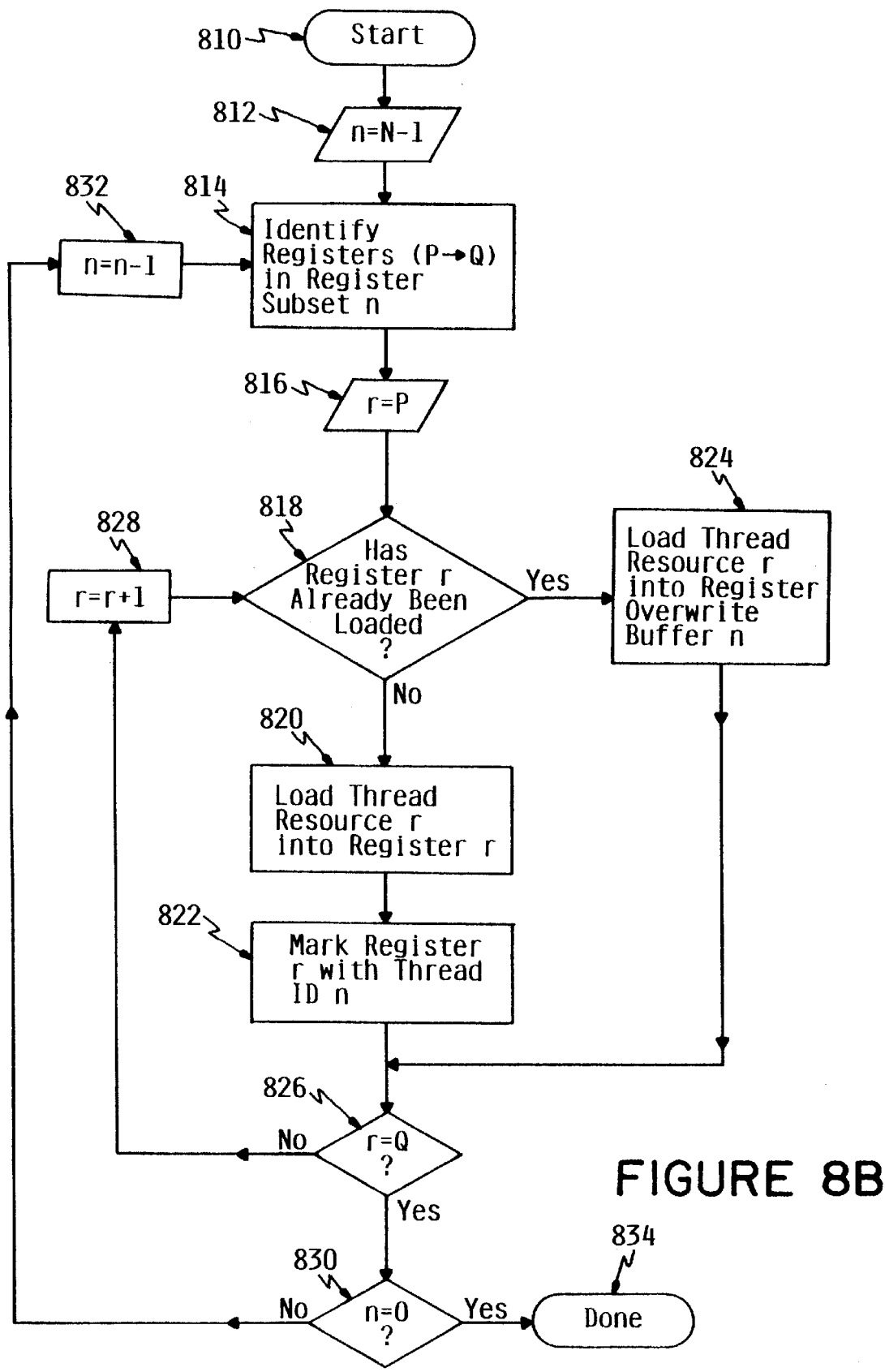
FIG. 8(b) is a high level logic flow chart of thread loading process or system for loading dynamic overlapping register subsets which may be implemented within the data processing system of FIGS. 1(a) or 1(b)
Figure 8C:
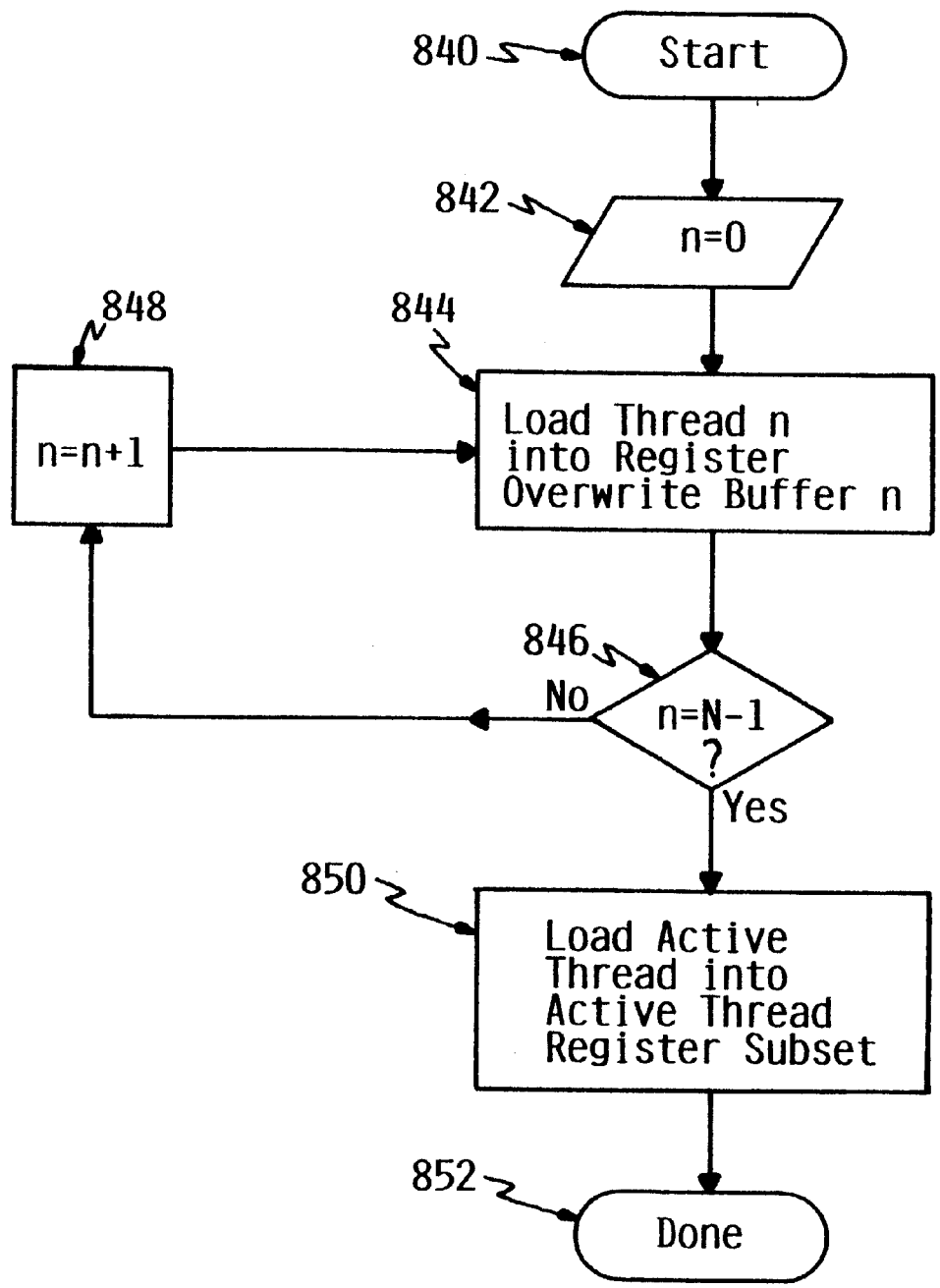
FIG. 8(c) is a high level logic flow chart of an alternative thread loading process or system for loading dynamic overlapping register subsets which may be implemented within the data processing system of FIGS. 1(a) or 1(b)
Figure 8D:
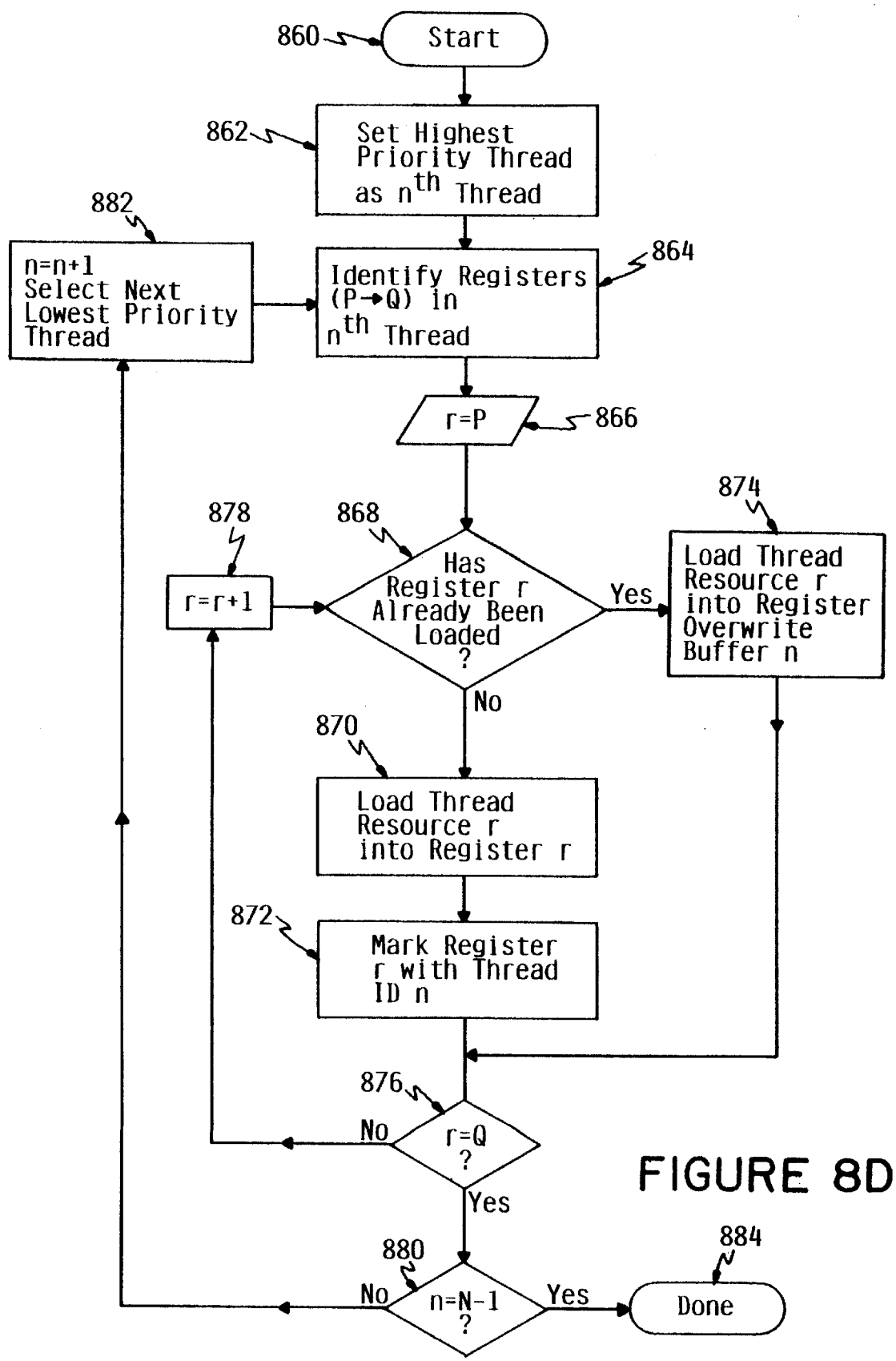
FIG. 8(d) is a high level logic flow chart of an another alternative thread loading process or system for loading dynamic overlapping register subsets according to relative thread priority which may be implemented within the data processing system of FIGS. 1(a) or 1(b)
Figure 9A:
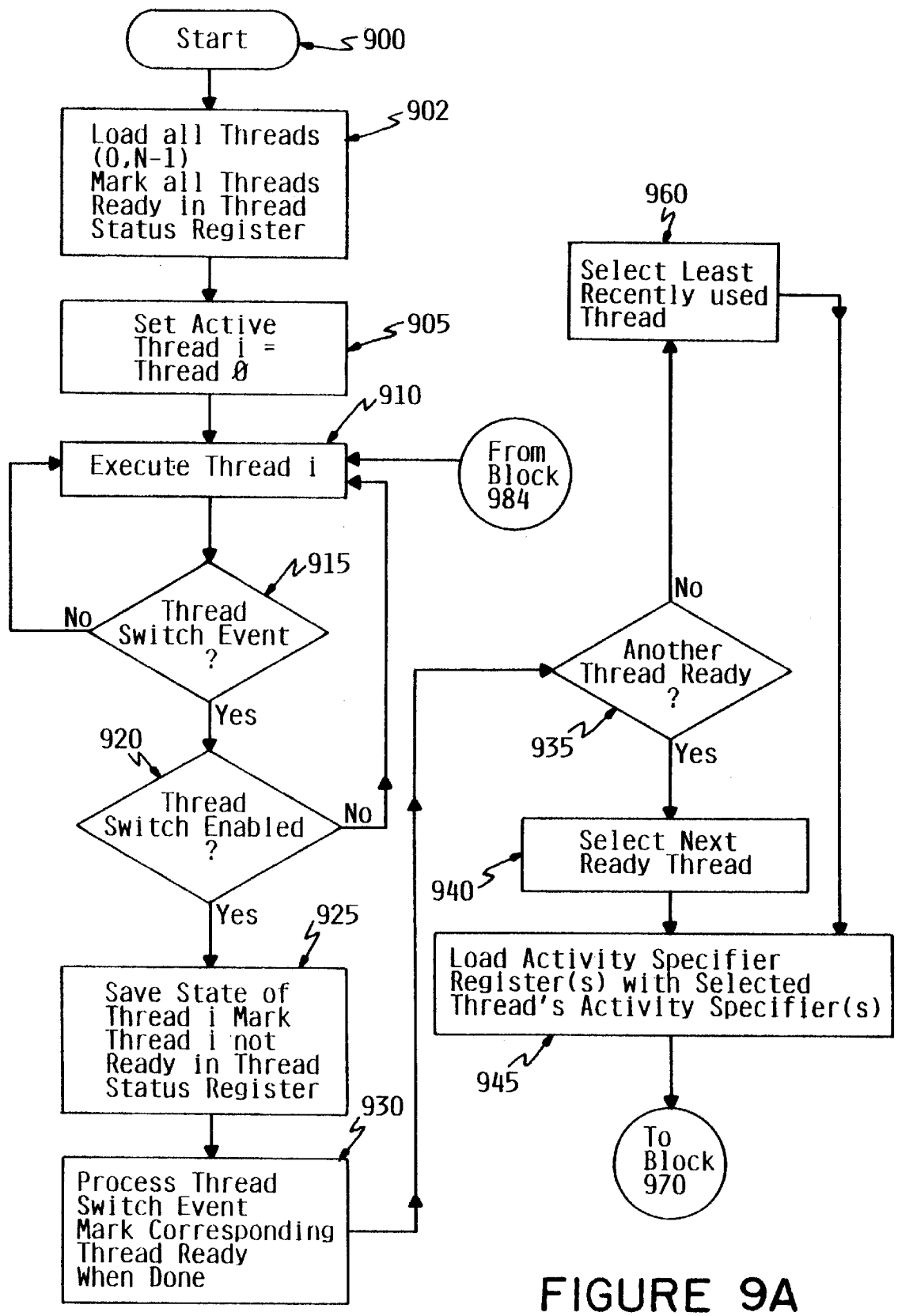
FIG. 9 is a high level logic flow chart of a process which may be implemented within the data processing system of FIGS. 1(a) or 1(b) which illustrates managing registers which have been partitioned into dynamic, overlapping register subsets in accordance with the method and system of the present invention.
Figure 9B:
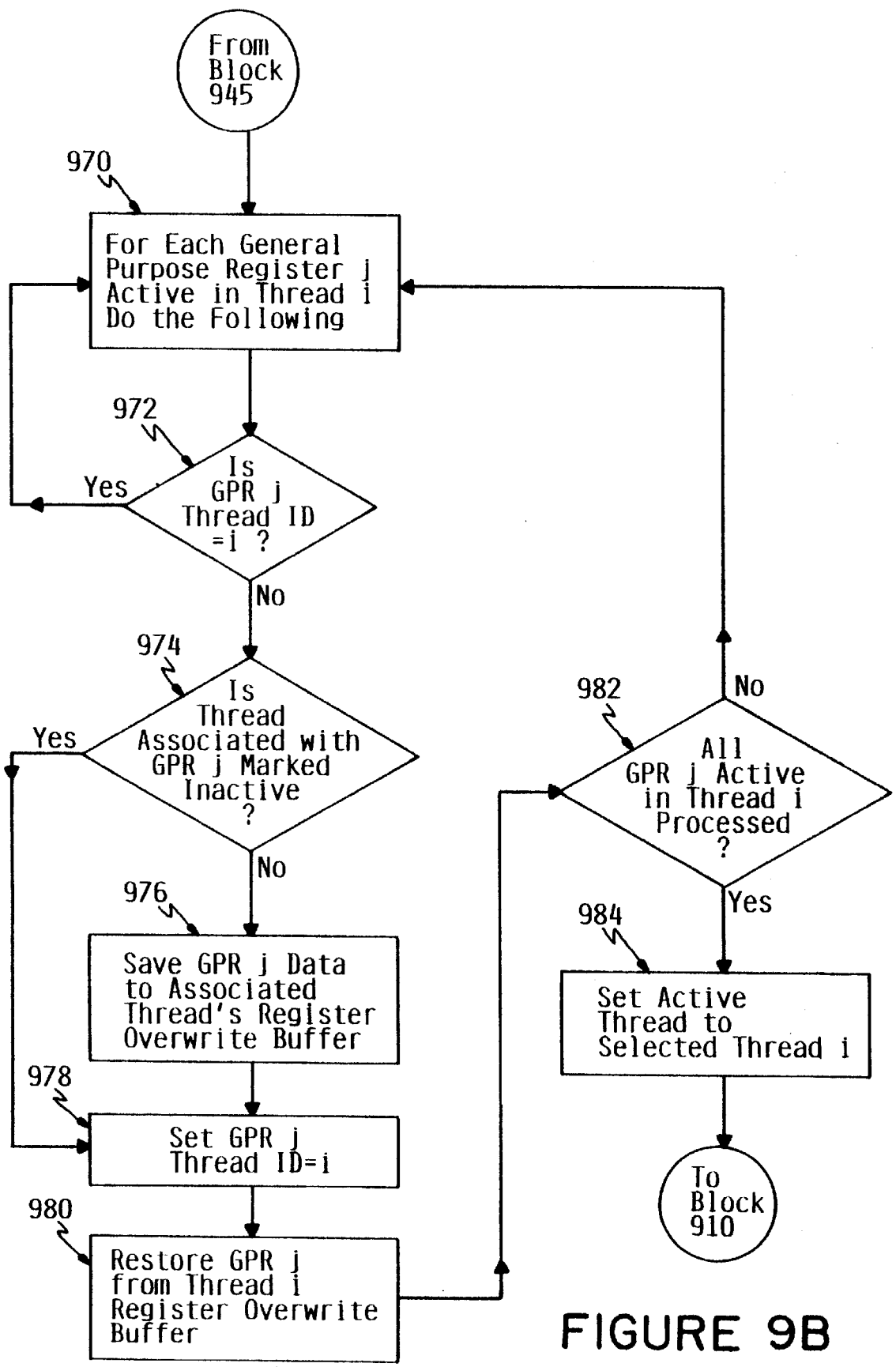

Loading and management of the register overwrite buffer 76 will be more particularly described in relation to FIGS. 8(*b*)–(*d*) and FIG. 9. Before more particularly describing the thread switching for overlapping register subsets, however, the simpler register loading process for non-overlapping register subsets will be described in relation to FIG. 8(*a*).

Loading Non-Overlapping Register Subsets

FIG. 8(*a*) is a high level logic flow chart of a non-overlapping register subset loading process which may be implemented within the data processing systems 10 of FIGS. 1(*a*) or (*b*). This process begins at block 800 and then continues with block 801. Block 801 defines a thread counter n and sets this thread counter n equal to 0. The process then continues with block 802.

Block 802 illustrates the loading of thread n into register subset n. In other words, the thread resources for thread n are loaded into the register subset n associated with that thread. Next, the process continues with block 804 which illustrates marking register subset n with thread ID n. More particularly, block 804 sets the thread identifier field 37 to thread ID n in each of the GPRs 36 and/or FPRs 40 belonging to the register subset. After block 804, the process continues with block 806.

Block 806 tests whether all threads have been processed by, for example, checking to see whether the thread counter n is equal to the total number of threads N-1. If all threads have been processed (n=N-1) then the process is completed as indicated by block 807. If, however, block 806 determines that not yet all threads have been processed (n≠N-1), then the process continues with block 808. Block 808 illustrates updating thread counter n. More particularly, n is updated by setting n=n+1. After updating the thread counter, the process continues to block 802 which loads thread n into register subset n as described above. The thread counter n illustrated in FIG. 8(a) may also begin at N−1 and count-down in descending order until N is equal to 0. Thus, the last thread loaded is thread 0 in this alternative.

Loading Overlapping Register Subsets

As mentioned above, FIG. 8(a) illustrates loading thread resources into non-overlapping register subsets. Complications arise, however, when overlapping register subsets are utilized. Loading processes for overlapping register subsets are set forth in FIGS. 8(b)–8(d). FIG. 8(b) is a high level logic flow chart of one process for loading threads into overlapping register subsets which may be implemented within the data processing system 10 of FIGS. 1(a) or 1(b). As depicted, the process begins at block 810 and thereafter passes to block 812.

Block 812 illustrates defining a thread counter index n and setting this index n equal to N−1. Thereafter, the process passes to block 814. Block 814 identifies those registers (from register P to register Q) that belong to register subset n. After identifying which registers belong to register subset n, the process continues with block 816 which defines another index r which is used to step through each of the registers from P to Q that belong to register subset n. Thereafter, the process continues with block 818.

Block 818 determines whether register r has already been loaded with a thread resource from a thread different than thread n. In other words, block 818 determines whether the register r is an overlapping register which has already been loaded with another thread resource from a different thread. Step 818 is necessary to prevent overwriting a previously loaded thread resource stored in register r with thread resource r from thread n. If block 818 determines that register r has already been loaded with another thread resource, then the process passes to block 824.

Block 824 resolves the potential conflict between the overlapping register r by loading the thread resource r into register overwrite buffer n. Instead of overwriting register r with thread resource r, the thread resource r is stored in register overwrite buffer n. Thus, all of the thread resources from each of the various threads are preserved in either the register subsets or one of the register overwrite buffers 76. If block 818 determines that register r has not already been loaded and is free to accept data from thread n, then the process continues with block 820. Block 820 loads thread resource r into register r. Then, the process continues with block 822 which marks register r with thread ID n. More particularly, block 822 sets the thread identifier field 37 equal to thread ID number n.

After either blocks 822 or 824, the process continues with block 826. Block 826 decides whether all of the registers r for thread n have been loaded. More particularly, block 826 checks index r to see if it is equal to Q which represents the last register in subset n. If all of the registers in register subset n have not yet been processed (r≈Q), then the process continues with block 828 which updates index r so that block 818 can determine if register r has already been loaded as described above. If, on the other hand, all of the registers r in subset n have been processed (r=Q) in block 826, then the process continues to block 830.

Block 830 tests whether all of the thread resources have been loaded. More particularly, block 830 tests index n and if n is not equal to 0, then the process continues with block 832. Block 832 updates the thread index n so that block 814 can identify registers belonging to the next register subset n as described above. If, on the other hand, block 830 determines that all of the registers subsets n have been loaded (n=0), then the register loading process is done as illustrated by block 834.

FIG. 8(b) utilizes a descending order for the register subset index n. Of course, an ascending order may be utilized as will apparent to those skilled in the art.

FIG. 8(c) is a variation of the overlapping register loading process. This process begins with start block 840 and thereafter continues with block 842. Block 842 defines a thread counter n and sets this thread counter n equal to 0. Thereafter, the process continues with block 844 which loads thread n into the register overwrite buffer n. In other words, the register overwrite buffer 76 corresponding to thread n is loaded with the thread resources from thread n.

Thereafter, the process continues with block 846 which determines whether all of the threads have been loaded into the register overwrite buffers 76. More particularly, block 846 test index n and if n is not equal to N−1 (the last thread), then the process updates the thread counter n in block 848 which permits block 844 to load the next thread n into register overwrite buffer n as described above. On the other hand, if block 846 determines that the last thread has been loaded into the register overwrite buffer 76 (n=N−1), then the process continues with block 850.

Block 850 loads an active thread into the active thread register subset. The active thread may be arbitrarily assigned or may be the thread having the highest priority. Thus, the processor 10 has all of the thread resources for the active thread readily available in the active thread register subset. After loading the active thread into the active thread register subset in block 850, the process is done as illustrated in block 852.

FIG. 8(c) is another alternative overlapping register subset loading process. This alternative loads all of the threads into the corresponding register overwrite buffers 76. In this way, overlapping registers are accommodated and no thread resource in an overlapping register is overwritten by another thread resource in the thread loading process. After loading the register overwrite buffers 76, an active thread is loaded from the active register overwrite buffer 76 into the active thread register subset so that the processor 10 has the active thread resources available in the processor registers GPRs 36 and/or FPRs 40.

FIG. 8(d) is further alternative overlapping register subset loading process. This further alternative loads thread resources into overlapping register subsets by taking into account the relative priority of the various threads.

This process begins with block 860 and thereafter continues with block 862. Block 862 sets the highest priority thread as the nth thread. As in the above processes, n is a index which keeps track of the threads during the thread loading process. In this alternative thread loading process, n is initially set to the highest priority thread. In this way, threads may be loaded beginning with the highest priority thread and ending with the lowest priority thread as will be more particularly described below. Thereafter, the process continues with block 864 which identifies those registers (from register P to register Q) which belong to thread n.

Then, a recursive loop is performed beginning with block 866 which sets a register counter r equal to the first register P in the nth register subset. Thereafter, the process continues with block 868.

Block 868 determines whether register r has already been loaded with a thread resource from a thread different than thread n. In other words, block 868 determines whether the register r is an overlapping register which has already been loaded with another thread resource from a different thread. Block 868 is necessary to prevent overwriting a previously loaded thread resource already stored in register r with thread resource r from thread n. By first loading the registers with the highest priority threads and then preventing overwriting of these highest priority threads with lower priority threads, the process ensures that the highest priority threads will have their resources readily available in the processor registers. If block 868 determines that register r has already been loaded with another thread resource, then the process passes to block 874.

Block 874 resolves the potential conflict over the overlapping register r by loading the thread resource r into register overwrite buffer n. Instead of overwriting register r with thread resource r, the thread resource r is stored in register overwrite buffer n. Thus, all of the thread resources from each of the various threads are preserved in either the register subsets or one of the register overwrite buffers 76.

If block 868 determines that register r has not already been loaded and is free to accept data from thread n, then the process continues with block 870. Block 870 loads thread resource r into register r. Then, the process continues with block 872 which marks register r with thread ID n. More particularly, block 872 sets the thread identifier field 37 equal to thread ID n.

After either blocks 872 or 874, the process continues with block 876. Block 876 decides whether all of the registers r for thread n have been loaded. More particularly, block 876 checks index r to see if it is equal to Q which represents the last register in subset n. If all of the registers in register subset n have not yet been processed (r≈Q), then the process continues with block 878 which updates index r so that block 868 can determine if register r has already been loaded as described above. If, on the other hand, all of the registers r in subset n have been processed (r=Q) in block 876, then the process continues to block 880.

Block 880 tests whether all of the thread resources have been loaded. More particularly, block 880 tests index n and if n≈N−1, then the process continues with block 882. Block 882 illustrates selecting the next lowest priority thread and updating the thread counter n (n=n+1) such that block 864 can identify those registers (P through Q) belonging to thread n as described above. If, on the other hand, block 880 determines that all of the registers subsets n have been loaded (n=N−1), then the register loading process is done as illustrated by block 884. Thus, the process illustrated in FIG. 8(d) first loads the highest priority thread into the corresponding register subsets. In this way, the processor 12 will be ensured that the highest priority thread has its thread resources readily available in the processor registers instead of the register overwrite buffers 76. As mentioned above in relation to block 868, if an overlapping register is detected and the register r has already been loaded (with a higher priority thread resource), then the lower priority thread resource is stored in one of the register overwrite buffers 76.

Of course, there are many variations of the above register loading processes. For example, FIG. 8(d) may be modified so as to load the threads beginning with the lowest priority thread and ending with the highest priority thread. The lower priority threads would preferably be delegated to the register overwrite buffers 76 and the higher priority threads would be given preference for the register space.

The thread loading process described in FIG. 8(a) is an example of the process performed by block 502 in FIG. 5 which loads all threads (0, N−1). Furthermore, thread loading processes described in FIGS. 8(b)–8(d) are examples of the process performed by block 902 in FIG. 9 which loads all threads (0, N−1) as described below.

THREAD SWITCHING WITH OVERLAPPING REGISTER SUBSETS

FIG. 9 depicts a high level logic flow chart which illustrates a process for managing overlapping register subsets and controlling thread switching where each thread may utilize an overlapping register subset which may be implemented with the data processing systems FIGS. 1(a) and (b). As illustrated in FIG. 9, the process begins at start block 900 thereafter passes to block 902. Block 902 illustrates the loading of all threads from 0 to N−1 from memory 14 to the corresponding register subsets within GPRs 36 and/or FPRs 40.

This thread loading process in block 902 may take several forms as more particularly described in relation to FIGS. 8(b), 8(c) and 8(d) above. After loading all threads, block 902 marks all threads READY in the thread status register 80. More particularly, corresponding flags in the thread READY/NOT-READY flags 86 are set to indicate that the associated threads are READY. Thereafter, the process passes to block 905.

If the modifications shown in FIG. 1(b) are used, then block 902 marks all threads READY in each of the individual thread status registers 85. More particularly, the thread READY/NOT-READY flags 87 are set in the corresponding individual thread status registers 85 to indicate that the associated threads are READY. Before marking each thread READY in the FIG. 1(b) modification, the thread controller 50 must first check the thread valid/invalid indicator 86 in each of the individual thread status registers 85 to ensure than only valid threads are marked as READY.

Block 905 illustrates setting the active thread, thread i, equal to thread 0. In the FIG. 1(a) embodiment, block 905 sets the active thread by writing the thread ID into the active thread identifier field 84 of the thread status register 80. Similarly, in the FIG. 1(b) embodiment, block 905 sets the active thread by writing thread ID into the active thread identifier field 94 of the overall thread status register 90. Alternatively, block 905 may set the active or current thread i equal to the thread having the highest priority. In this alternative, the data processing system shown in FIG. 1(b) can be utilized. More particularly, the thread controller 50 accesses the thread priority fields 88 in the individual thread status registers 85 to determine which thread has the highest priority. Then, the thread controller 50 can write the ID of the highest priority thread into the active thread identifier field 94 within overall thread status register 90 to set the active thread.

After block 905, the process passes to block 910. Block 910 illustrates the execution of thread i by data processing system 10. To execute thread i, the activity specifier from thread i is loaded into the activity specifier register 39. With the activity specifier for thread i loaded, the data processing system 10 can then execute the active thread i by utilizing the associated active thread register subset. Execution of active thread i continues until a thread switch event occurs. Block 915 tests whether such a thread switch event has occurred and, if not, directs the process to continue executing the active thread i in block 910. A thread switch event may include an L2 cache miss or translation lookaside buffer miss. Other thread switch events known in the art may also trigger block 915. Upon the occurrence of a thread switch event, however, block 915 causes the process to continue with block 920.

Block 920 determines whether thread switching is enabled. To accomplish this determination, block 920 tests the single/multithread indicator 82 or 92 in thread status register 80 or the overall thread status register 90, respectively. If thread switching has not been enabled, then block 920 decides that single-thread operations must be performed and the process must continue to execute the active thread i in block 910. On the other hand, if thread switching is enabled, then block 920 decides that multithread operation may be performed and the process continues with block 925.

To switch threads, the state of thread i must first be saved. Block 925 illustrates saving the state of the active thread i. As discussed above, the state of a thread includes an activity specifier such as the program counter for that thread, condition code register and/or stack pointer register each of which are unique to a given thread. More particularly, block 925 transfers the activity specifier data for thread i from the activity specifier register 39 to the active register subset. Then, block 925 marks thread i as NOT-READY in the thread READY/NOT-READY flags 86 within thread status register 80. Alternatively, block 925 marks thread i as NOT-READY in the thread READY/NOT-READY flag 87 within a corresponding individual thread status register 85.

Thereafter, the process continues with block 930. Block 930 depicts the concurrent processing of the thread switch event and the marking of thread i as READY when the thread switch event has been resolved. In other words, block 930 illustrates continued attempts to complete the process that triggered the thread switching event such as completing the memory request from memory 14. When this thread switch triggering process has been completed, then that thread is now ready and this READY status is then indicated in either the thread status register 80 or the corresponding individual thread status register 85 as described above.

Then, the process continues with block 935. Block 935 decides whether there is another thread ready for execution. More particularly, the thread controller 50 accesses the thread READY/NOT-READY flags 86 or 87 in either the thread status register 80 or the corresponding individual thread status registers 85 to determine if there is a thread ready for execution. If there is a thread ready for execution as determined by block 935, then the process passes to block 940. Block 940 selects the next ready thread for execution. The next ready thread may be selected from those threads having a READY status indicator in the thread status register 80 or the individual thread status register 85 as described above.

Selection of the next ready thread in block 940 may also use a thread prioritizafion scheme which selects the thread having the highest priority and also having a READY status. The thread prioritization scheme was described above in relation to FIG. 1(b). The priority of each thread is stored in a thread priority field 88 within each of the individual thread status registers 85. With the thread priority field 88, the thread controller 50 is able to select the highest priority thread for execution in block 940. Thread prioritization schemes are generally known to those of ordinary skill in the art and may be used with this invention. The methods and apparatus for managing and storing thread priority for partitioned register sets, however, is a feature of this invention.

If block 935 determines that there is not another thread ready for execution, then the process passes to block 960. Block 960 selects the least recently used thread as the next thread to be executed. The thread which was least recently used or executed is generally the thread most likely to have already resolved its thread switch event. Thus, delays due to memory latency may be minimized by selecting the least recently used thread as the next active thread. After blocks 940 or 960, the process continues with block 945.

Block 945 illustrates loading the activity specifier register 39 with the selected thread's activity specifier data. In other words, the state of the selected thread is loaded into the activity specifier register 39. Thereafter, the process passes to block 970.

Blocks 970 through 982 illustrate a recursive process which is performed for GPR j that is in the active in thread i. Blocks 970 though 982 illustrate this recursive register swapping process and, taken together, ensure that each GPR j that is in the register subset for thread i is processed as will be described below. Block 972 determines whether the thread identifier field 37 identifies this register j as belonging to thread i. If block 972 determines that GPR j has a thread identifier field 37 equal to i indicating that GPR j is within thread i's register subset, then the current GPR j should be left undisturbed. Thus, in this case, the process continues with step 970 which retrieves the next GPR j that is active in thread i. On the other hand, if block 972 determines that GPR j has a thread identifier field 37 not equal to thread i indicating that GPR j is not within thread i's register subset, then the process continues to block 974. Conceptually, a NO determination in block 972 corresponds to the case where the current general purpose register j belongs to a different thread register subset. Thus, a NO determination in block 972 indicates that GPR j is an overlapping register.

Block 974 determines if the thread associated with GPR j is marked inactive. In other words, block 974 utilizes the thread identifier field 37 in GPR j to identify the associated thread. If the thread so identified is not an inactive thread indicating that the thread is active, then the contents of GPR j must be preserved before thread switching is permitted. Thus, if block 974 determines that the thread associated with GPR j is an active thread, then the process continues to block 976. Block 976 saves the data in GPR j in the associated thread's register overwrite buffer 76. The associated thread is the thread identified in the thread identifier field 37 of the general purpose register j. In other words the data in GPR j must be preserved in the associated thread's register overwrite buffer 76 before it is overwritten by data from the next thread. Thereafter, the process continues to block 978. If block 974 determines that the thread associated with general purpose register j is marked "inactive", then the process continues with block 978. The determination of active or inactive thread may be performed by comparing the thread identifier field 37 in GPR j with the thread status register 80 which contains, as described above, an active thread identifier field 84 indicating which thread is active. A similar comparison can be made with the active thread identifier field 94 within overall thread status register 90.

Block 978 sets the thread ID field 37 in GPR j to thread i. In other words, GPR j is an overlapping register which previously belonged to or was associated with another thread. Block 978 now associates this GPR j with thread i by setting the thread identifier field 37 in the general purpose register j to thread i. Thereafter, the process continues with block 980.

Block 980 restores general purpose register j from thread i's register overwrite buffer 76. With the data from GPR j safely preserved and the other thread's register overwrite buffer 76, block 980 may safely overwrite GPR j with the data from thread i which has been stored in thread i's register overwrite buffer 76. Another way of expressing blocks 976, 978 and 980 is register swapping which swaps active thread resources for next thread resources by storing the overlapping register from the active thread register subset in a register overwrite buffer 76 and loading the overlapping register from the next thread register subset with a next thread resource. As mentioned above, block 982 tests whether all the general purpose registers j which are active in thread i have been processed by blocks 974–980. If block 982 determines that there are still remaining GPR j's which need to be processed, then the process continues with block 970 as described above. If, however, block 982 determines that all of the GPR j's active in thread i have already been processed, then the process continues to block 984.

Block 984 sets the active thread to the selected thread i. In other words, the active thread identifier field 84 or 94 in the thread status register 80 or overall thread status register 90, respectively is loaded with the identifier for the selected thread i. Furthermore, the activity specifier from thread i is loaded into the activity specifier register 39 so that thread i can be executed. Thereafter, the process continues with block 910 which executes thread i.

FIG. 9 is described above by referring to GPR j. It is to be understood that the set of processor registers in not limited to the GPRs 36 but may include GPRs 36 and/or FPRs 40. Those skilled in the art should appreciate "multi-threading" as defined within the present disclosure wherein multiple independent threads are executing is preferably implemented in hardware. Thus, the present invention may be utilized to greatly reduce the delay due to memory latency by maintaining the state of multiple threads and selectively switch between those threads in response to thread switch event.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A computer processor originally architected for single task processing adapted for multithreaded operations, said computer processor having a processing unit, the computer processor comprising:

an activity specifier register;

at least one general purpose and/or floating point register set partitioned into a plurality of register subsets, each register subset associated with one of a plurality of threads to be executed in the computer processor, wherein at least one of the register subsets is an active thread register subset, and at least one of the register subsets is an overlapping register subset, said register set partitioned and said overlapping register subsets associated with more than one thread to adapt said processor from single task processing to enable multi-threaded operations;

a load/store unit for passing thread resources into and out of the register subsets;

a thread controller controlling said load/store unit to load thread resources including activity specifier data for the threads into corresponding register subsets;

said thread controller controlling said load/store unit to load activity specifier data from the active thread register subset into the activity specifier register to permit the processing unit to execute the active thread by utilizing the active thread register subset;

said thread controller controlling said load/store unit to store the contents of the activity specifier register in the active thread register subset and load an activity specifier from a next thread register subset into the activity specifier register upon an occurrence of a thread switch event to permit the processing unit to execute the next thread by utilizing the next thread register subset.

2. The apparatus of claim 1, wherein the at least one overlapping register subset is associated with the active thread register subset and the next thread register subset, and the thread controller analyzes the register subsets to identify the at least one overlapping register subset; and the thread controller swaps a portion of active thread resources for next thread resources by storing the at least one overlapping register subset from the active thread register subset in at least one register overwrite buffer and loading the at least one overlapping register subset from the next thread register subset with a next thread register resource.

3. The apparatus of claim 2, wherein all active thread resources are loaded into the register overwrite buffer.

4. The apparatus of claim 1, further comprising:

a plurality of register overwrite buffers, wherein each thread has a corresponding register overwrite buffer;

a plurality of individual thread status registers, wherein each thread has a corresponding individual thread status register storing an indication of thread priority;

the thread controller controlling said load/store unit to load thread resources in a corresponding register subset according to a thread priority order;

the thread controller analyzing the thread register subsets to identify the at least one overlapping register subset associated with more than one thread;

the thread controller controlling said load/store unit to load the at least one overlapping register subset with thread resources having a higher priority and to load a corresponding register overwrite buffer with thread resources having a lower priority.

5. The apparatus of claim 1, the register subsets having an equal number of registers per register subset.

6. The apparatus of claim 1, at least one of the register subsets having a different number of registers than another register subset.

7. The apparatus of claim 1, the register subsets further including registers having a thread identifier field; and said thread controller controlling said load/store unit to load a thread identifier into the thread identifier field when loading the register subsets with corresponding thread resources.

8. The apparatus of claim 1, further comprising:

a thread status register including a thread READY/NOT-READY bit for each thread indicating whether a corresponding thread is READY or NOT-READY;

said thread controller controlling said load/store unit to load all of the thread READY/NOT-READY bits with a READY indication when the thread resources are initially loaded into the corresponding register subsets;

said thread controller controlling said load/store unit to load a corresponding one of the thread READY/NOT-READY bits with a NOT-READY indication upon the occurrence of the thread switch event.

9. The apparatus of claim 8, thread controller controlling said load/store unit to load a corresponding one of the thread READY/NOT-READY bits with a READY indication upon satisfaction of the thread switch event.

10. The apparatus of claim 8, thread status register further including a single-thread/multithread indication bit indicating whether single-thread or multithread processing is enabled wherein the processor enables multithread operation according to the single-thread/multithread indication bit.

11. The apparatus of claim 8, said thread status register further including an active thread identifier field identifying which of the plurality of threads is active.

12. The apparatus of claim 8, further comprising a register mask for each of the threads, said register masks identifying registers belonging to the corresponding thread's register subset.

13. A computer having a processing unit and an activity specifier register, the computer comprising:
   at least one general purpose and/or floating point register set originally architected for single task processing by the processing unit partitioned into a plurality of register subsets wherein at least one of the register subsets is an active thread subset, and at least one of the register subsets is an overlapping register subset associated with more than one thread, said partitioned register set and said overlapping register subset enabled to adapt the processing unit originally architected for single thread processing to enable multithreaded operations on said computer;
   a load/store unit for passing thread resources into and out of the register subsets;
   a plurality of register overwrite buffers, wherein each thread has a corresponding register overwrite buffer;
   a plurality of individual thread status registers, wherein each thread has a corresponding individual thread status register storing an indication of thread priority;
   a thread controller controlling said load/store unit to load thread resources including activity specifier data from the active thread register subset into the activity specifier register according to a priority order to permit the processing unit to execute the active thread by utilizing the active thread register subset;
   said thread controller analyzing the register subsets to identify the at least one overlapping register subset associated with the active thread register subset and with the next thread register subset;
   said thread controller controlling said load/store unit to store the contents of the activity specifier register in the active thread register subset and, upon an occurrence of a thread switch event, to swap the active thread resources for next thread resources by storing the at least one overlapping register subset from the active thread register subset with active thread resources having a lower priority in a register overwrite buffer and loading the at least one overlapping register subset from the next thread register subset with a next thread register resource having a higher priority.

14. A method of computer processing on a computer originally architected for single task processing, said computer having a processing unit, a processor register set, and an activity specifier register, the method comprising the steps of:
   partitioning at least one general purpose and/or floating point register of the processor register set into register subsets;
   allocating the processor register subsets to a plurality of threads, including at least one overlapping register subset associated with more than one thread, said steps of partitioning and allocating performed to adapt said computer from single task processing to multithreaded operations;
   loading thread resources including activity specifier data into the corresponding register subsets allocated by said allocating step;
   loading activity specifier data from an active thread register subset into the activity specifier register to permit the processing unit to execute the active thread by utilizing the active thread register subset; and
   analyzing the thread register subsets to identify the at least one overlapping register subset associated with the active thread register subset and with the next thread register subset;
   storing the contents of the activity specifier register in the active thread register subset and, upon an occurrence of a thread switch event, to swap the active thread resources for next thread resources by storing a portion of the at least one overlapping register subset from the active thread register subset having active thread resources in a register overwrite buffer and loading the overlapping register from the next thread register subset with a next thread register resource.

15. The method of claim 14, further comprising the step of providing a plurality of register overwrite buffers, wherein each thread has a corresponding register overwrite buffer.

16. The method of claim 14, further comprising:
   analyzing the thread register subsets to identify the at least one overlapping register subset associated with more than one thread; and said thread resource load step further comprising loading thread resources in corresponding register subsets according to a thread priority order and loading the at least one overlapping register subset with thread resources having a higher priority and loading a corresponding register overwrite buffer with thread resources having a lower priority.

17. The method of claim 14, said partitioning step partitioning the processor register set into register subsets having an equal number of registers per register subset.

18. The method of claim 14, said partitioning step partitioning the processor register set such that at least one of the register subsets has a different number of registers than another register subset.

19. The method of claim 14, further comprising the step of providing each of the registers in the register subsets with a thread identifier field; said loading thread resources step including the substep of loading a thread identifier into the thread identifier field.

20. The method of claim 14, further comprising the steps of:
   providing a thread status register with a thread READY/NOT-READY bit for each of the threads;
   said thread resource loading step further including the substep of loading all of the thread READY/NOT-READY bits with a READY indication; and
   loading a corresponding one of the thread READY/NOT-READY bits with a NOT-READY indication upon the occurrence of the thread switch event.

21. The method of claim 20, further comprising the step of
   loading a corresponding one of the thread READY/NOT-READY bits with a READY indication upon satisfaction of the thread switch event.

22. The method of claim 21, further comprising the step of providing the thread status register with a single-thread/multithread indication bit indicating whether single-thread or multithread processing is enabled wherein the processor enables multithread operation according to the single-thread/multithread indication bit.

23. A method of multithread computer processing on a computer originally architected for single task processing having a processing unit, a processor general purpose and/or floating point register set, and an activity specifier register, the method comprising the steps of:

- retrofitting multithread operations into the computer by partitioning the general purpose and/or floating point processor register set into thread register subsets; and allocating the thread register subsets to a plurality of threads, comprising at least one overlapping register subset associated with more than one thread and an active thread register subset;
- providing a plurality of register overwrite buffers, wherein each thread has a corresponding register overwrite buffer;
- analyzing the thread register subsets to identify any overlapping register subsets associated with more than one thread;
- loading thread resources including activity specifier data into the corresponding register subsets according to a thread priority order;
- loading activity specifier data from an active thread register subset into the activity specifier register to permit the processing unit to execute the active thread by utilizing the active thread register subset;
- loading at least one overlapping register subset with thread resources having a higher priority; and loading a corresponding register overwrite buffer with thread resources having a lower priority;
- analyzing the thread register subsets to identify at least one overlapping register subset associated with the active thread register subset and with a next thread register subset;
- swapping active thread resources for next thread resources by storing the at least one overlapping register subset from the active thread register subset in a register overwrite buffer and loading the at least one overlapping register subset from the next thread register subset with a next thread resource to permit the processing unit to execute the next thread by utilizing the next thread register subset.

* * * * *